United States Patent
Kashyap et al.

(10) Patent No.: US 8,411,353 B2
(45) Date of Patent: Apr. 2, 2013

(54) QUASI-PHASE-MATCHED WAVELENGTH CONVERTER

(75) Inventors: Raman Kashyap, Baie D'Uree (CA); Amirhossein Tehranchi, Montreal (CA)

(73) Assignee: Polyvalor, Limited Partnerhsip, Montreal, Quebec (CA)

( * ) Notice: Subject to any disclaimer, the term of this patent is extended or adjusted under 35 U.S.C. 154(b) by 119 days.

(21) Appl. No.: 12/855,477

(22) Filed: Aug. 12, 2010

(65) Prior Publication Data

US 2011/0038034 A1 Feb. 17, 2011

Related U.S. Application Data

(60) Provisional application No. 61/233,230, filed on Aug. 12, 2009.

(51) Int. Cl.
*G02F 1/35* (2006.01)

(52) U.S. Cl. .................. 359/326; 359/328

(58) Field of Classification Search ............ 359/326
See application file for complete search history.

(56) References Cited

U.S. PATENT DOCUMENTS

| | | | | | |
|---|---|---|---|---|---|
| 5,387,998 | A | * | 2/1995 | Kitaoka et al. | 359/328 |
| 5,815,307 | A | * | 9/1998 | Arbore et al. | 359/328 |
| 5,867,304 | A | * | 2/1999 | Galvanauskas et al. | 359/333 |
| 7,009,759 | B2 | * | 3/2006 | Chou et al. | 359/326 |
| 7,511,878 | B2 | * | 3/2009 | Okayama et al. | 359/326 |
| 2003/0231890 | A1 | * | 12/2003 | Asobe et al. | 398/187 |
| 2007/0121685 | A1 | * | 5/2007 | Maekawa | 372/21 |
| 2011/0026103 | A1 | * | 2/2011 | Suchowski et al. | 359/326 |
| 2011/0317254 | A1 | * | 12/2011 | Patel | 359/326 |

OTHER PUBLICATIONS

Tehranchi et al., Engineered gratings for flat broadening of second-harmonic phase-matching bandwidth in MgO-doped lithium niobate waveguides, published Nov. 3, 2008 in Optics Express, Journal dated Nov. 10, 2008.
Tehranchi et al., Novel designs for efficient broadband frequency doublers using singly pump-resonant waveguide and engineered chirped gratings, published Feb. 1, 2009 in IEE Journal of Quantum Electronics.
Tehranchi et al., Novel step-chirped quasi-phase matched gratings for broadband frequency doublers with high-efficiency flat response in nonlinear optical waveguides, Aug. 12, 2008 URSIGA08, Chicago Aug. 7 to 16, 2008.
Kashyap et al., Efficient Broadband Frequency Conversion Using Engineered Apodized X(2) Gratings and Fundamental Harmonic Resonance, Jul. 2009, OECC09, Hong Kong, Jul. 14, 2009.
Tehranchi et al., A New Design of Apodized Step-Chirped Gratings for Broadband Wavelength Converters, Sep. 2, 2007, NP07, Quebec, Sep. 2 to 6, 2007.
Tehranchi et al., Design of novel Unapodized and Apodized Step-Chirped Quasi-Phase Matched Gratings for Broadband Frequency Converters Based on Second-Harmonic Generation, published Feb. 1, 2008 in IEEE Journal of Lightwave Technology.

(Continued)

*Primary Examiner* — Hemang Sanghavi
(74) *Attorney, Agent, or Firm* — Norton Rose Canada LLP

(57) ABSTRACT

There is provided an optical frequency converter comprising: an optical guiding structure having an input and an output, and comprising: a first grating portion adjacent to the input; a second grating portion adjacent to output, and a third grating between the first and second grating portion to form an apodized step-chirped grating extending between the input and the output. Each grating portion comprises a plurality of sections each comprising a plurality of segments. Each segment has a segment width and comprises a poled region having a poled width at least equal to one micron and a reversely poled region. The segment width for all of the grating portions and a duty ratio of the poled width to the segment width are constant within each section. The duty ratio increases within the first grating portion, decreases within the second grating portion, and is constant within the third grating portion.

15 Claims, 14 Drawing Sheets

OTHER PUBLICATIONS

Umeki et al., Broadband wavelength conversion based on apodized X(2) grating, published Nov. 16, 2009, Optical Society of America.

A. Tehranchi and R. Kashyap; "High-efficiency pump-resonant quasi-phase-matched frequency doublers with flat broadband responses", In Proceedings of the International Symposium on SPIE Photonic Devices + Applications, vol. 7420-48, Aug. 2-6, 2009, San Diego, USA.

* cited by examiner

QUASI-PHASE-MATCHED WAVELENGTH CONVERTER

CROSS-REFERENCE TO RELATED APPLICATIONS

The present application claims priority under 35 USC §119 (e) on U.S. Provisional Patent Application Ser. No. 61/233,230 filed on Aug. 12, 2009, the entire content of which is incorporated herein by reference.

TECHNICAL FIELD

The present invention relates to the field of non-linear optical devices, and particularly to periodically poled optical structures.

BACKGROUND

Nonlinear optical devices comprising a grating of periodically poled regions and based on quasi-phase matching (QPM) have been developed for doubling the frequency of an input optical signal to generate a second harmonic output signal. Some of these devices have been developed for obtaining broadband QPM waveguide converters. While being efficient in providing broadband second harmonic generation (SHG), the efficiency curves of broadband SHG suffers from ripples which are not appropriate for broadband SHG response.

Therefore, there is a need for an improved QPM wavelength converter.

SUMMARY

According to a broad aspect, there is provided an optical frequency converter comprising: an optical guiding structure having an input for inputting a fundamental harmonic signal and an output for outputting a second harmonic signal, and comprising: a first grating portion adjacent to the input; a second grating portion adjacent to output, and a third grating between the first and second grating portion to form an apodized step-chirped grating extending between the input and the output, each one of the first, second, and third grating portions comprising a plurality of sections each comprising a plurality of segments, each segment having a segment width and comprising a poled region having a poled width at least equal to one micron and a reversely poled region, the segment width for the first, second, and third grating portions and a duty ratio of the poled width to the segment width being constant within each one of the sections, the segment width increasing from one of the sections to a following one of the sections from the input towards the output, the duty ratio increasing from one section to a following one within the first grating portion, decreasing from one section to a following one within the second grating portion, and being constant within the third grating portion.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
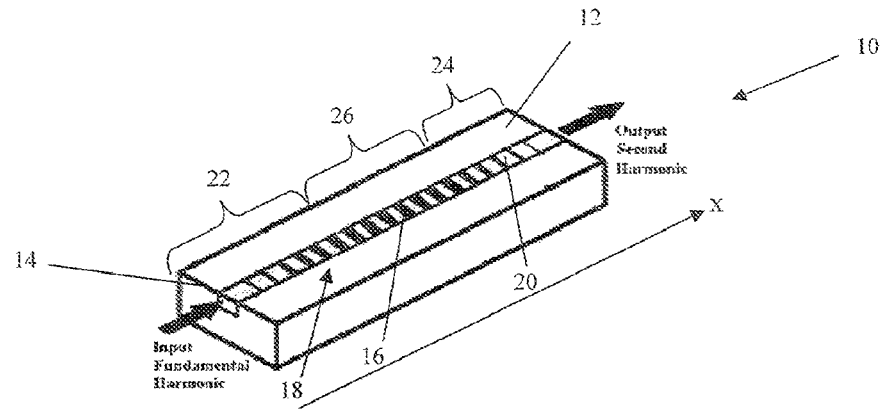
FIG. 1 is a schematic of a substrate comprising an apodized step-chirped, poled waveguide channel, in accordance with an embodiment.

FIG. 1 illustrates one embodiment of a QPM wavelength converter 10. The converter 10 comprises a planar substrate 12 having a channel waveguide 14 extending along an axis x from an input to an output. A fundamental harmonic signal enters the channel waveguide 14 by the input and propagates along the channel waveguide 14 while generating a second harmonic signal which outputs the channel waveguide by the output.

The fundamental harmonic signal is an optical signal. The wavelength of the fundamental harmonic signal may be comprised within the visible spectrum, the infrared spectrum, or the like. The generated second harmonic signal is also an optical signal.

The waveguide channel 14 comprises a plurality of poled or domain-inverted regions 16 extending along the channel axis x, thereby forming a grating structure 18. Following poled regions 16 are interspaced by a reversely poled region 20, and each poled region 16 and its following reversely poled region form a segment. The width of a segment corresponds to the period of the grating. The grating structure 18 is divided into a first step-chirped grating (SCG) portion 22 adjacent to the input, a second SCG portion 24 adjacent to the output, and a third SCG portion 26 therebetween.

Figure 2:
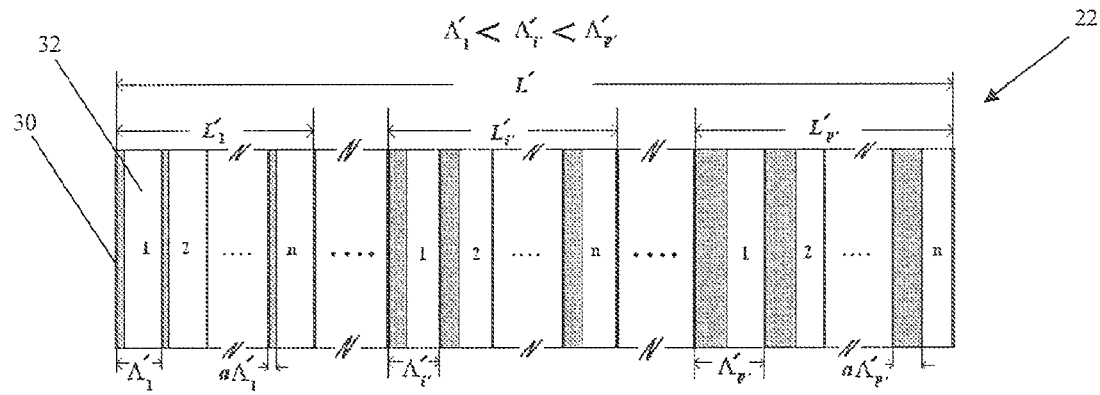
FIG. 2 is a schematic of a grating of poled regions having an increasing duty ratio, in accordance with an embodiment.

FIG. 2 illustrates one embodiment of the first SCG portion 22 having a length L'. The SCG portion 22 is divided into p' sections 1, ..., p' having a respective length $L'_1, ..., L'_{p'}$. Each section 1, ..., p' comprises a plurality of poled regions 30 each followed by a reversely poled region 32. The period of the grating $\Lambda'_1, ..., \Lambda'_{p'}$ is defined by a segment, i.e. a poled region 30 and its following reversely poled region 32, and the period increases from one section to a next one so that $\Lambda'_1<\Lambda'_{p'}$, while being substantially constant within each section 1, ..., p'. Each poled region has a width $a\Lambda'_1..., a\Lambda'_{p'}$, where a is defined as the duty ratio of the poled region width to the period $\Lambda'_1, ..., \Lambda'_{p'}$. The duty ratio a is substantially constant within each section 1, ..., p', and increases from one section to a next one so that the duty ratio of the first section is less than that of the section p'.

Figure 3:
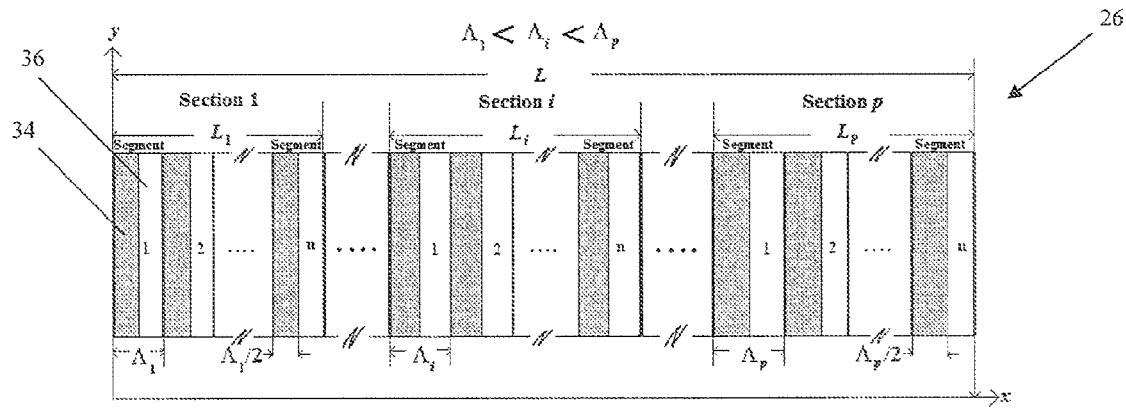
FIG. 3 is a schematic of a grating of poled regions having a constant duty ratio, in accordance with an embodiment.

FIG. 3 illustrates one embodiment of the third SCG portion 26 having a length L. The SCG portion 26 is divided into p sections 1, ..., p having a respective length $L_1, ..., L_p$. Each section 1, ..., p comprises a plurality of poled regions 34 each followed by a reversely poled region 36. The period of the grating $\Lambda_1, ..., \Lambda_p$ is defined by a segment, i.e. a poled region 34 and its following reversely poled region 36, and the period increases from one section to a next one so that $\Lambda_1<\Lambda_p$ while being substantially constant within each section 1, ..., p. Each poled region has a width $a\Lambda_1, ..., a\Lambda_p$ where a is defined as the duty ratio of the poled region width to the period $\Lambda_1 ..., \Lambda_p$. The duty ratio a is substantially constant within each section 1, ..., p and from one section to a next one. In one embodiment, the duty ratio a is equal to 0.5.

Figure 4:
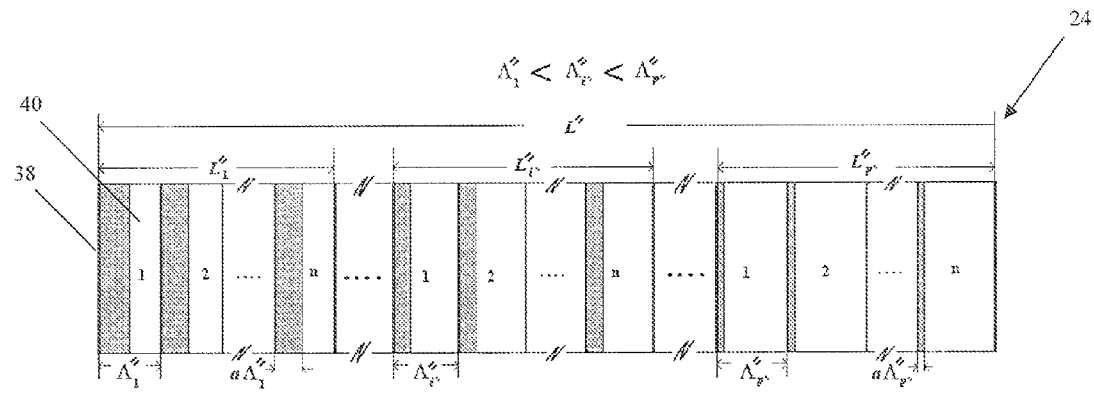
FIG. 4 is a schematic of a grating of poled regions having a decreasing duty ratio, in accordance with an embodiment.

FIG. 4 illustrates one embodiment of the second SCG portion 24 having a length L". The SCG portion 24 is divided into p" sections 1, ..., p" having a respective length $L''_1, ..., L''_{p''}$. Each section 1, ..., p" comprises a plurality of poled regions 38 each followed by a reversely poled region 40. The period of the grating $\Lambda''_1, ..., \Lambda''_{p''}$ is defined by a poled region 38 and its following reversely poled region 40, and the period increases from one section to a next one so that $\Lambda''_1<\Lambda''_{p''}$ while being substantially constant within each section 1, ..., p". Each poled region has a width $a\Lambda''_1, ..., a\Lambda''_{p''}$ where a is defined as the duty ratio of the poled region width to the period $\Lambda''_1, ..., \Lambda''_{p''}$. The duty ratio a is substantially constant within each section 1, ..., p" and decreases from one section to a next one so that the duty ratio of the first section is more than that of the section p".

In one embodiment, the period $\Lambda'_{p'}$ of the last section p' of the SCG portion 22 is less than the period $\Lambda_1$ of the first section of the SCG portion 26, and the period $\Lambda''_1$ of the first section of the SCG portion 24 is greater than the period of the last section p of the SCG portion 26 so that the period increases from one section to a next along the entire grating 18. The duty ratio of the last section p' of the SCG portion 22 and that of the first section of the SCG 24 are less than the duty ratio of the SCG portion 26.

In one embodiment, the SCG portion 26 is designed as follows. For frequency doublers based on SHG taking advantage of QPM, any phase mismatch between laser wavelength and gratings should be resolved. Uncertainty in the propagation constant, error in the fabrication process and fluctuation of the laser wavelength and temperature variations may increase the mismatch. Not only does a SCG provide a better means for fabrication of highly-broadband converters but also is able to solve the above problems by broadening the phase matching bandwidth.

In the SCG 26, the total grating length (L) has been divided into p sections that each section consists of n constant periods $\Lambda_i$ or n segments as a uniform grating with a 50% duty factor which is the ratio of the domain-inverted or poled region to the period. Therefore, the section length is ($L_i$=n$\Lambda_i$, i=1, 2, ..., p). The period of the sections changes according to a function which we assume to be $$\Lambda_i = \Lambda_1 + \Delta\Lambda(i-1), \quad \text{Eq. 1}$$

where $\Lambda_1$ the period of the first section, $\Delta\Lambda$ is the chirp step or period change between two adjacent sections.

To obtain the total second harmonic wave amplitude and efficiency, we can consider p uniform gratings in a periodically poled lithium niobate waveguide. The calculations begin and cascade from the first section with the length $L_1$ to the last section with the length $L_p$, in which we use the nonlinear coupled mode equations $$\frac{d}{dx}A_{FH}(x) = -j\kappa * A_{FH}*(x) A_{SH}(x) e^{-j\Delta kx} - \frac{1}{2}\alpha_{FH} A_{FH}(x), \quad \text{Eq. 2}$$

$$\frac{d}{dx}A_{SH}(x) = -j\kappa [A_{FH}(x)]^2 e^{+j\Delta kx} - \frac{1}{2}\alpha_{SH} A_{SH}(x), \quad \text{Eq. 3}$$

in order to describe SHG in each section. Equations 2 and 3 are solved numerically to take into account pump depletion. ($A_{FH},\alpha_{FH}$) and ($A_{SH},\alpha_{SH}$) are the amplitudes and losses of the fundamental harmonic (FH) and the second harmonic (SH) waves, respectively, and $\Delta k$ is the phase mismatch parameter of each section defined as $\Delta k = \beta_{2\omega} - 2\beta_\omega - 2\pi/\Lambda_i$ where $\beta_\omega = 2\pi N_\omega/\lambda_\omega$ and $\beta_{2\omega} = 2\pi N_{2\omega}/\lambda_{2\omega}$ are the mode propagation constants of the FH and SH waves, respectively. ($N_\omega$, $\lambda_\omega$) and ($N_{2\omega},\lambda_{2\omega}$) are the effective refractive indexes and wavelengths for the FH and SH waves, respectively. Also, the coupling factor is defined as:

$$\kappa = \varepsilon_0 \sqrt{\frac{(2\omega)^2}{2(N_\omega)^2 N_{2\omega}} \left(\frac{\mu_0}{\varepsilon_0}\right)^{3/2} \frac{d_{eff}^2}{S_{eff}}}, \quad \text{Eq. 4}$$

where $\mu_0$ is the permeability of free space, $d_{eff} = (2/\pi)d_{33}$ is the effective nonlinear coefficient for 50% duty ratio and the effective area is given by:

$$S_{eff} = \frac{\iint |E_{2\omega}(y,z)|^2 dydz \left[\iint |E_\omega(y,z)|^2 dydz\right]^2}{\left[\iint [E_{2\omega}(y,z)]^*[E_\omega(y,z)]^2 dydz\right]^2}. \quad \text{Eq. 5}$$

where $E_\omega(y,z)$ and $E_{2\omega}(y,z)$ are the normalized mode profiles for the FH and SH waves, respectively, in a z-cut LN waveguide, which is assumed to have a uniform cross section and to be parallel to the optical axis which is called here the x-axis. Equation 4 shows that the coupling factor is directly proportional to the effective nonlinear coefficient and inversely to the square root of the effective area. The effective area of a ~6 μm×3 μm LN waveguide with the maximum index difference of 0.01 is ≅20 μm².

The phase mismatch parameter $\Delta k$ of each section is calculated first by finding the extraordinary indexes for different wavelengths using the Sellmeier expression in $LiNbO_3$ $$n_e^2 = 4.5820 + \frac{0.0992 + 5.2716\times 10^{-8}F}{\lambda^2 - (0.21090 - 4.9143\times 10^{-8}F)^2} - 0.021940\lambda^2 + 2.2971\times 10^{-1}F, \quad \text{Eq. 6}$$

where $\lambda$ is the wavelength in μm and F=894.75 at 26° C.; and second by applying the effective refractive indexes of the waveguide. Finally, the SHG conversion efficiency is defined as:

$$\eta = |A_{SH}(x=L)|^2 / |A_{FH}(x=0)|^2. \quad \text{Eq. 7}$$

The bandwidth of a section in a step-chirped grating is determined as follows. We choose the length $L_1$ of the uniform grating consisting of n segments of period $\Lambda_1$. For the loss-less case that the pump is also non-depleting, the efficiency is given as $\kappa^2 P_0 L_1^2 (\sin \mu/\mu)^2$ where $\mu=\Delta k L_1$ and $P_0=A_{FH}^2(0)$ is the incident FH power. Neglecting the wavelength dependence of $\kappa$, the full-width half maximum (FWHM) bandwidth of a section $\delta\lambda$ is attained when the efficiency drops to 0.5 where $\mu=\Delta k L_1=1.39$, then $$\left[\frac{2\pi}{\lambda}\Delta N - \frac{\pi}{\Lambda_1}\right] L_1 = \pm 1.39, \quad \text{Eq. 8}$$

where $\lambda = \lambda_c \pm \delta\lambda/2$ and $\Delta N = N_{2\omega} - N_\omega$.

For $\delta\lambda \ll \lambda_c$, we have $$\frac{\Delta N}{\lambda} \cong \frac{\Delta N}{\lambda_c \mp \frac{\delta\lambda}{2}} \cong \frac{\Delta N}{\lambda_c} \pm \Delta N \frac{\delta\lambda}{2\lambda_c^2}, \quad \text{Eq. 9}$$

where we assumed $\Delta N(\lambda) \cong \Delta N(\lambda_c)$. Substituting Equation 9 in Equation 8, we obtain:

$$\frac{\delta\lambda}{\lambda_c} \cong \frac{1.39\lambda_c}{\pi \Delta N L_1} \cong \frac{2.78}{\pi}\frac{\Lambda_1}{L_1} \cong \frac{0.88}{n}. \quad \text{Eq. 10}$$

Therefore, the bandwidth of a section in an SCG is approximately equal to the product of the central wavelength and the ratio of the period of the grating to the total length of the section. In other words, the bandwidth of a section decreases as the number of the segments increase, thus the SCG bandwidth will be smaller. Equation 10 is a basic rule for the bandwidth calculation of a section in a SCG structure. For example, using a 10-segment SCG device (n=10), a rough estimate of maximum bandwidth for each section is approximately calculated using Equation 10 as $\delta\lambda \approx 0.88\lambda_c/n \approx 135$ nm near 1550 nm.

In one embodiment, in order to understand how the SCG bandwidth changes for the different SCG fundamental parameters of p, n and $\Delta\Lambda$, several combinations are presented in the following. FIGS. 5 to 8 illustrate the efficiency of the SCG versus the FH wavelength for different p, n and $\Delta\Lambda$ parameters. Also, the FH input power is assumed 50 mW.

Figure 5:
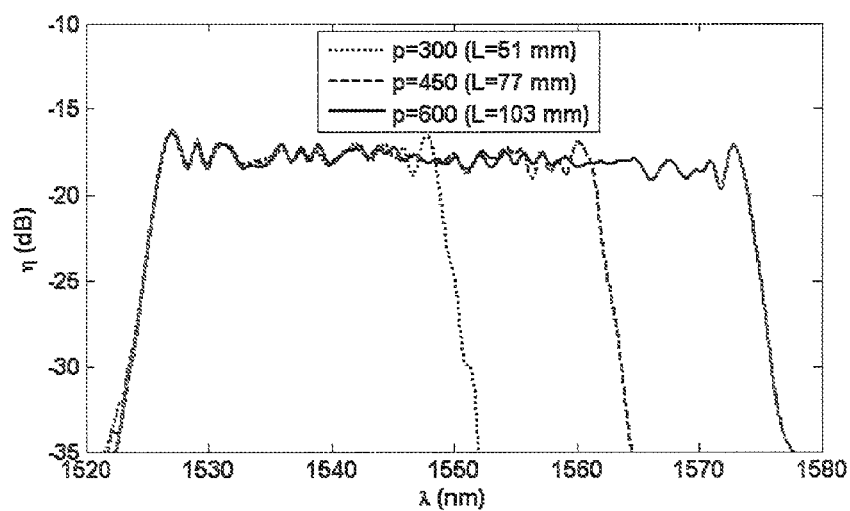
FIG. 5 is a graph of second harmonic generation efficiency of an unapodized step-chirped grating as a function a fundamental harmonic wavelength for different number of sections p, n=10 and $\Delta\Lambda=1$ nm, in accordance with an embodiment.

In one embodiment, taking a 50-nm bandwidth around 1550 nm into account, requires the maximum grating length of ~10 cm where the period starts as $\Lambda_1$=16881 nm and therefore n×p=6000 is achieved. Thus, for n=10, 600 sections exist and the chirp step around 1 nm is necessary to cover the 3-dB bandwidth of 50 nm. For this case, the graphs are shown in FIG. 5. It is seen that for broadband SHG, interference among phase matching conditions causes large ripples on the conversion efficiency response with the peak-to-peak of around 3 dB.

However, shorter the length results in smaller the bandwidth and a bandwidth of 25 nm for the SCG is achieved with about 300 sections where the average efficiency over the bandwidth is about −17.5 dB whilst using a uniform grating with the same length of ~5 cm, a bandwidth less than half a nanometer and an efficiency near 0 dB can be achieved.

Figure 6:
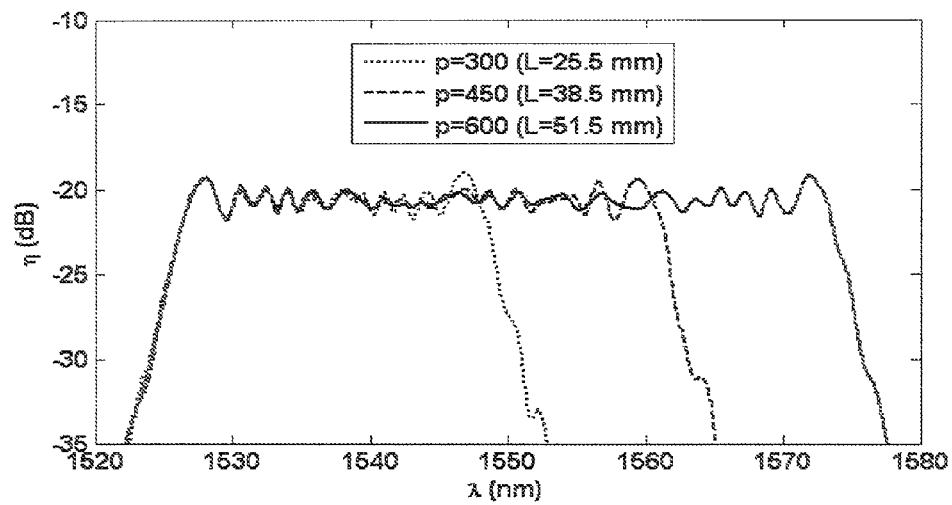
FIG. 6 is a graph of second harmonic generation efficiency of an unapodized step-chirped grating versus a fundamental harmonic wavelength for different numbers of sections p, n=5 and $\Delta\Lambda=1$ nm, in accordance with an embodiment.

In FIG. 5, the SCG structure needs a total length of more than 5 cm for a bandwidth greater than 25 nm which is substantially hard to fabricate on lithium niobate (NL) substrates. To attain the bandwidth of 50 nm with a <5-cm long SCG, one possibility is to decrease n. In other words, at the expense of losing efficiency we reach the same bandwidth with the shorter SCG which is suitable for fabrication. This case for n=5 is depicted in FIG. 6. Actually, the conversion efficiency of the new SCG is almost 3-dB lower than that of FIG. 5 because of the length of each section has been decreased to half.

Figure 7:
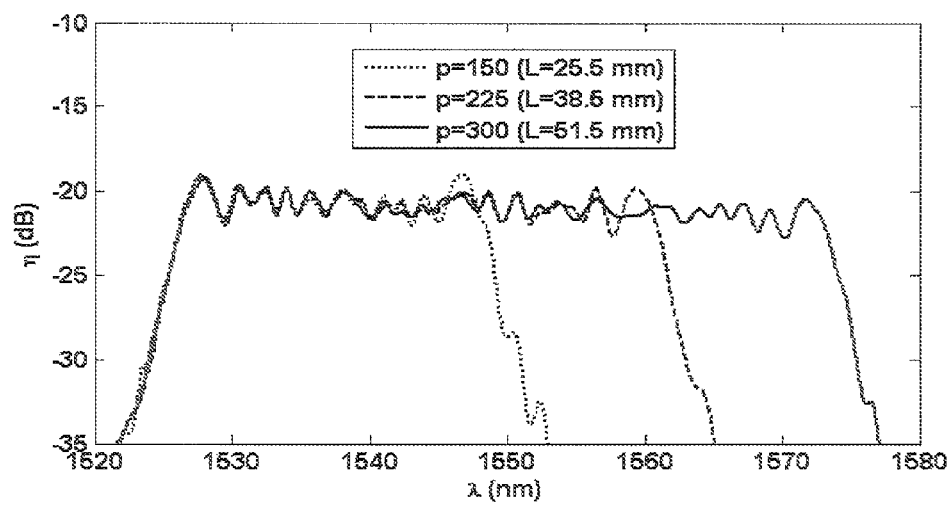
FIG. 7 is a graph of second harmonic generation efficiency of an unapodized step-chirped grating versus a fundamental harmonic wavelength for different numbers of sections p, n=10 and $\Delta\Lambda=2$ nm, in accordance with an embodiment.

Another possibility to achieve the maximum bandwidth of 50 nm with a shorter SCG length, is to increase the chirp step. FIG. 7 illustrates the efficiency for n=10 and $\Delta\Lambda$=2 nm. One can note that the efficiency drops by almost 3 dB when the chirp step is doubled, with increased fluctuation on the efficiency response in comparison with FIG. 5. Also the average efficiency is more slanted as a function of wavelength. So, there is an upper limit for increasing the period as it leads to a sloping response with wavelength and reduces the bandwidth.

In one embodiment, for a constant length, doubling the sections (e.g. halving the segments), nearly doubles the bandwidth and halves the efficiency. On the other hand, doubling the chirp step $\Delta\Lambda$, also roughly doubles the bandwidth and halves the efficiency.

Figure 8:
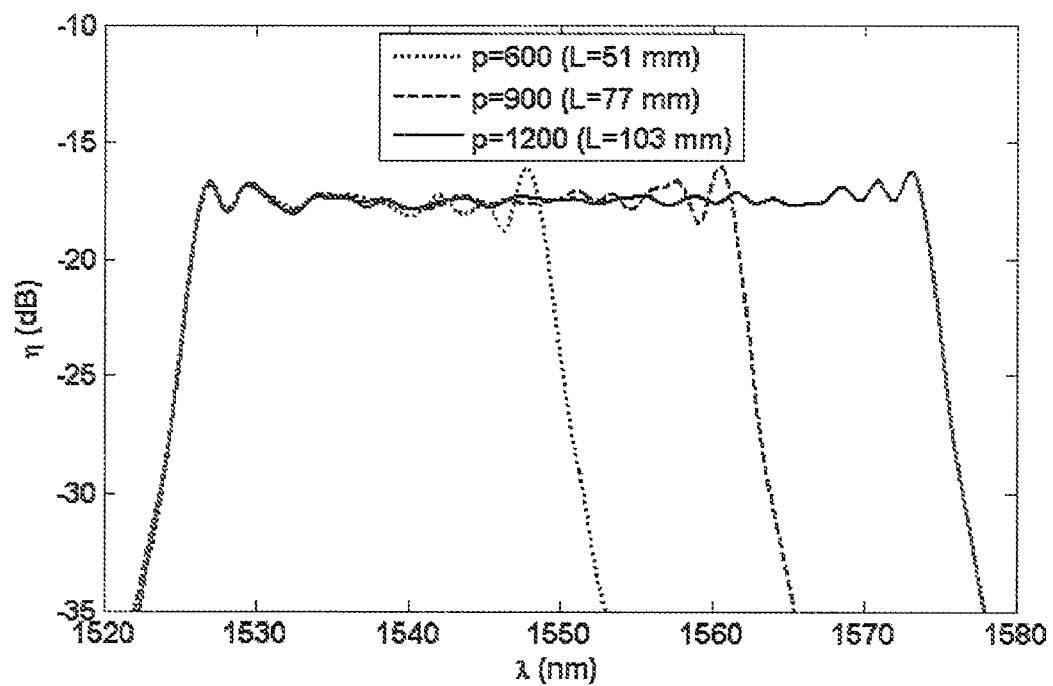
FIG. 8 is a graph of second harmonic generation efficiency of an unapodized step-chirped grating versus a fundamental harmonic wavelength for different numbers of sections p, n=5 and $\Delta\Lambda=0.5$ nm, in accordance with an embodiment.

FIG. 8 shows the efficiency for n=5 and $\Delta\Lambda$=0.5 nm. The result is almost the same as FIG. 5. Consequently, doubling the sections and halving the chirp in FIG. 5 gives approximately the same result as seen in FIG. 8. Following the same approach, if the chirp changes to one-tenth and the sections tenfold (segments changes to one-tenth), the result remains substantially as that of FIG. 5. So, to achieve the same result, the linearly chirped grating structure needs a smaller period difference in comparison to the SCG structure. Then, to achieve almost the same bandwidth and efficiency, instead of a smooth linear chirp, using a step chirp increases the difference in periods which is convenient for fabrication.

By examining the results of the previous SCG structures, it appears that for $\Delta\Lambda$=1 nm, the number of sections required for an acceptable unit bandwidth in nm from the grating is also a constant, i.e. 12 sections. To study the significance of the chirp step, we note that the approximate FWHM bandwidth of a section with period $\Lambda$ is given by Equation 10 and noting the total bandwidth $\Delta\Lambda$ and length L in meters and $p \approx 12\Delta\lambda/\Delta\Lambda$, we get the bandwidth of the section which is equal to $\delta\lambda \approx 10\Lambda\lambda_c\Delta\lambda/(L\Delta\Lambda)$. Thus, using the total length of around 5 cm, the central frequency at 1550 nm and the chirp step of 1 nm, the bandwidth of each section is related to the SCG bandwidth by:

$$\delta\lambda \approx 5.4\Delta\lambda. \qquad \text{Eq. 11}$$

In one embodiment, for the constant length of 5 cm, the bandwidth of each section of the SCG should be greater 5.4 times the total bandwidth. If we need to design a 50-nm-bandwidth SCG with the length of around 5 cm and $\Delta\Lambda$=1 nm, according to FIG. 3, $n \approx L/p\Lambda_{p/2}$ and the SCG will be realized with the number of segments equal or less than 5 (see FIG. 6).

Additionally, fewer sections in the same length of the SCG give better efficiency because they have more segments. By examining FIGS. 5 and 6, we understand that the 50-nm bandwidth can be achieved in both (600 sections: 10 segments) and (600 sections: 5 segments) schemes, but in the latter the length and the average efficiency are almost halved.

In one embodiment, apodized step-chirped gratings can be designed as follows. Apodization can reduce the non-uniformity in the broadband conversion efficiency response of frequency doublers. The ripple feature of SCGs in FIGS. 5 to 8 is created by the interference among the constituent phase matching spectra originating from different positions in the gratings.

The wave equation governs the electric field E(x,t) propagation in the presence of nonlinear polarization $P_{NL}(x,t)$ in the nonlinear medium where the polarization is only a perturbation to the system. Assuming that both the electric field and nonlinear polarization are scalar plane waves and invoking the slowly varying envelope approximation, it can be described as follows:

$$\frac{\partial^2}{\partial x^2}E(x,t) - \mu_0\varepsilon\frac{\partial^2}{\partial t^2}E(x,t) = \mu_0\frac{\partial^2}{\partial t^2}P_{NL}(x,t). \qquad \text{Eq. 12}$$

The wave equation is derived in the frequency domain by taking the Fourier transform of Equation 12 given by:

$$\frac{\partial^2}{\partial x^2}\tilde{E}(x,\omega) + \mu_0\varepsilon\omega^2\tilde{E}(x,\omega) = -\mu_0\omega^2\tilde{P}_{NL}(x,\omega). \qquad \text{Eq. 13}$$

Describing the fields in complex notation as $$\tilde{E}(x,\omega) = \frac{1}{2}\{\mathcal{E}(x,\omega)e^{-jk(\omega)x} + \mathcal{E}^*(x,-\omega)e^{jk(-\omega)x}\},$$

and assuming the slowly varying envelope approximation, Equation 13 can be simplified approximately as:

$$\frac{\partial}{\partial x}\mathcal{E}(x,\omega) \approx -j\frac{\mu_0\omega c}{2n_{(\omega)}}\mathcal{P}_{NL}(x,\omega)e^{jk(\omega)x}. \qquad \text{Eq. 14}$$

It is possible to define the spectrum of nonlinear polarization leading to SH field with the following relation:

$$\mathcal{P}_{NL,2\omega}(x,\Omega) = \epsilon_0 d_{eff}\{(\mathcal{E}_\omega e^{-jkx}) \otimes (\mathcal{E}_\omega e^{-jkx})\} \qquad \text{Eq. 15}$$

where $\otimes$ stands for convolution. Thus, Equation 14 gives the equation governing the SH field as:

$$\frac{\partial}{\partial x}\mathcal{E}_{2\omega}(x,\Omega) \approx -jk'd_{eff}\left\{\int_0^\infty \mathcal{E}_\omega(\omega')\mathcal{E}_\omega(\Omega-\omega')e^{j\Delta k(\Omega,\omega')x}d\omega'\right\}, \qquad \text{Eq. 16}$$

where $\kappa' = \omega_0/n_{2\omega}c$ and $\Delta k(\Omega,\omega') = k(\Omega) - k(\omega') - k(\Omega-\omega')$ which is a function of the frequencies at the SH ($\Omega$) and FH ($\omega'$). By integrating Equation 16 over the total length, the SH spectrum at the output of the converter of length L is $$\mathcal{E}_{2\omega}(L,\Omega) = -j\kappa'\{\mathcal{E}_\omega \otimes \mathcal{E}_\omega(\Omega)\}\int_{over\ L}d_{eff}(x)e^{j\Delta k(\Omega)x}dx. \qquad \text{Eq. 17}$$

In Equation 17, the phase matching spectrum can be engineered by controlling the effective nonlinear coefficient, $d_{eff}(x)$. Here, we are only interested in the SH power spectrum. In other words, the effort should be focused to create a broad power spectrum controlling $d_{eff}(x)$ while we change the grating period, such that every local period $\Lambda(x)$ contributes to a constituent phase matched spectrum. In other words, the efficiency curve of the chirped structure versus wavelength is associated with sharp edges in the effective nonlinear coefficient. This is also true for an SCG with a constant $d_{eff}(x)$. This problem can be solved by introducing some form of apodization on the effective SHG coefficient. Therefore, proposing the apodized SCG, the effective nonlinear coefficient is engineered to flatten the efficiency curve of broadband SHG. A reduction in the ripple on the efficiency response of broadband LCG and SCG frequency doublers by tailoring the duty ratios of inverted domains is thus predicted.

In one embodiment, the apodization of SCGs is designed to flatten the broadband SHG efficiency response. Evolution of conversion bandwidth and the reduction of ripple on efficiency response of SHG-based wavelength conversion by increasing the duty ratio of inverted domains are demonstrated. FIGS. 2 and 4 illustrate the model of the typical grating with several periodically increasing and decreasing inverted domains, respectively, added at the beginning and the end of SCG illustrated in FIG. 3 to form an apodized SCG (ASCG) structure.

These two parts are periodically poled in each section and aperiodically poled over the whole length. In this ASCG structure, the first and second grating with lengths L' and L" have been divided into equal p'=p" sections such that each section has the length ($L'_i=n\Lambda'_i$, $L''_i=n\Lambda''_i$, $i=1, 2, \ldots, p'$) consisting of n segments with constant periods $\Lambda'_i$ and $\Lambda''_i$. The periods of the sections in L' and L" change according to a function which we assume to be $\Lambda'_i=\Lambda'_1+\Delta\Lambda(i'-1)$ and $\Lambda''_i=\Lambda''_1+\Delta\Lambda(i''-1)$ where $\Lambda'_1$ and $\Lambda''_1$ are the periods of the first sections of the first and second grating structures, respectively. The period relations of these two parts (FIGS. 2 and 4) which are settled in the right and left side of the SCG structure (illustrated in FIG. 3) described as $\Lambda_i=\Lambda'_p+\Delta\Lambda$ and $\Lambda''_i=\Lambda_p+\Delta\Lambda$. Moreover, the effective nonlinear coefficient of the region within a grating period with the duty ratio of $\alpha_i$ is $d_{i(eff)}=(2d_{33}/\pi)\sin(\alpha_i\pi)$. Thus, in each section we have a uniform grating but with slightly different $d_{i(eff)}$ from its adjacent section by changing the duty ratio which denotes the ratio of one poled region to the period. Consequently, this model of the typical domain-inverted quasi-phase matched gratings has increasing and decreasing duty ratios and effective nonlinear coefficients, at the beginning and at the end of the structure. According to FIGS. 2 to 4, $r=L_{apod}/L_t \cong 2p'/p_t$ is the apodization ratio or the ratio of the total length with varying effective nonlinear coefficients $L_{apod} \cong 2L'$ to the total length of the device $L_t=L+2L'$. The total length is $L_t \cong (p+2p')n\Lambda_{p/2}=p_tn\Lambda_{p/2}$ where $\Lambda_{p/2}$ is the period of the central section.

Figure 9:
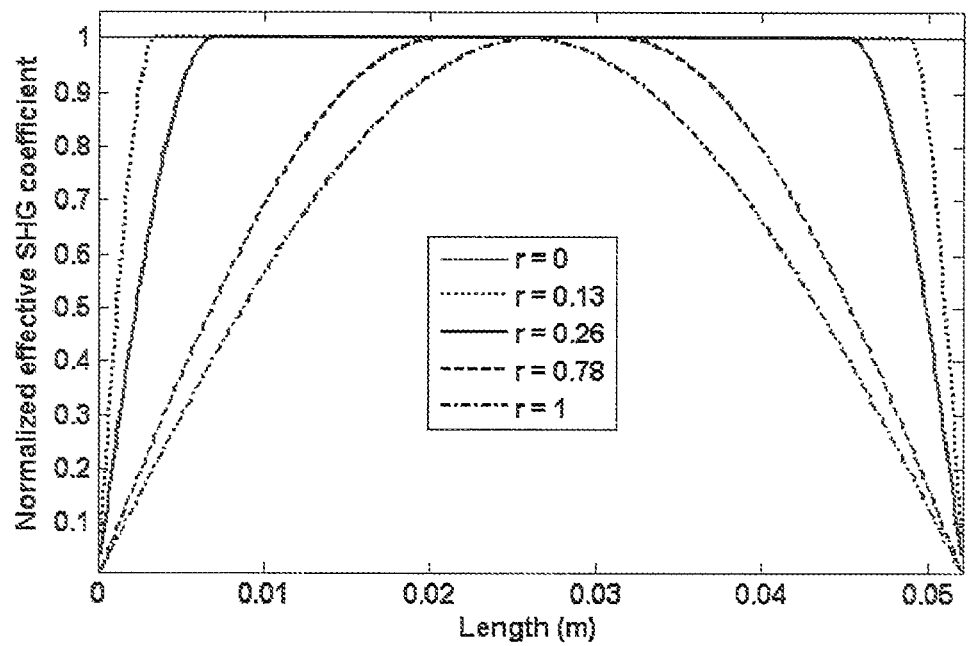
FIG. 9 illustrates different apodization functions versus a length for different apodization ratios, with $np_t=3000$, in accordance with an embodiment.

FIG. 9 illustrates the normalized effective nonlinear coefficient versus the grating length for different r parameters. The curve corresponding to r=0 illustrates a straight line implying an unapodized device while r=1 depicts a half-cycle sine curve showing a totally apodized device. However, between these two numbers, one can find partially apodized devices.

Figure 10:
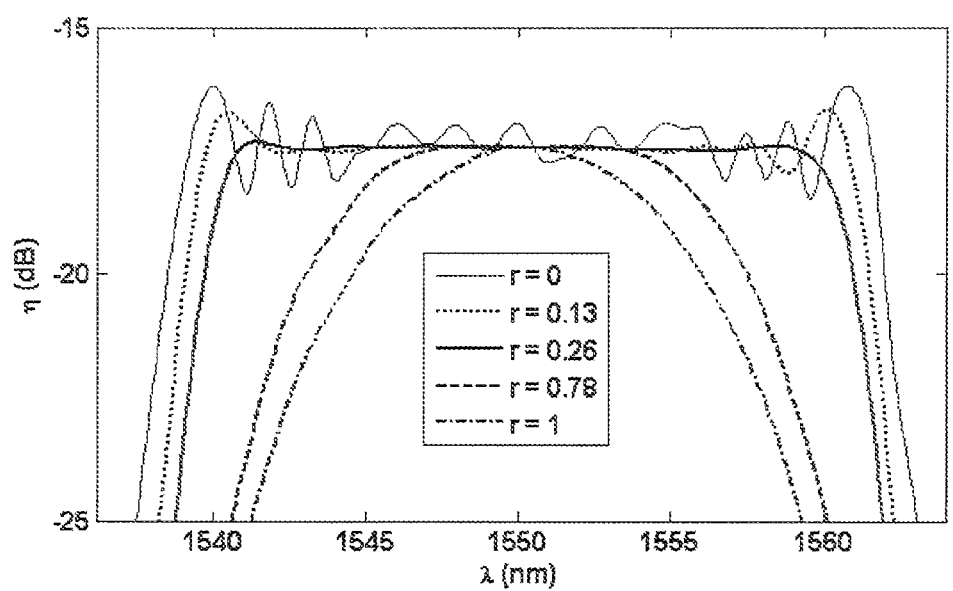
FIG. 10 is a graph of second harmonic generation efficiency of a step-chirped grating and an apodized step-chirped grating for the different apodization ratios with n=10, $p_t=300$, $\Lambda'_i=17193$ nm and $\Delta\Lambda=1$ nm, in accordance with an embodiment.

Efficiency curves versus the FH for the unapodized and apodized SCG structure, based on related apodization functions illustrated in FIG. 9, are illustrated in FIG. 10 for $p_t=300$, n=10, $\Lambda'_1=17193$ nm and $\Delta\Lambda=1$ nm, where the total length of all the gratings is about 5 cm and FH input power is 50 mW. According to FIG. 10, enhancement of conversion efficiency and reduction of the ripples in the efficiency response of SHG-based wavelength converter by increasing and decreasing the duty ratio of inverted domains at the beginning and end parts of quasi-phase matched gratings are demonstrated. For a small apodization ratio r=0.13, the efficiency is nearly ripple-free except for the two residual "ears" at the edges. Further suppression of these spectral ears can be achieved by introducing longer apodization regions. For r=0.26, the nearly flat bandwidth of about 23 nm and a maximum flat efficiency of about −17.5 dB can be achieved. It is seen that with increasing r, one cannot obtain improved and different forms of efficiency curves with decreased bandwidths.

Figure 11:
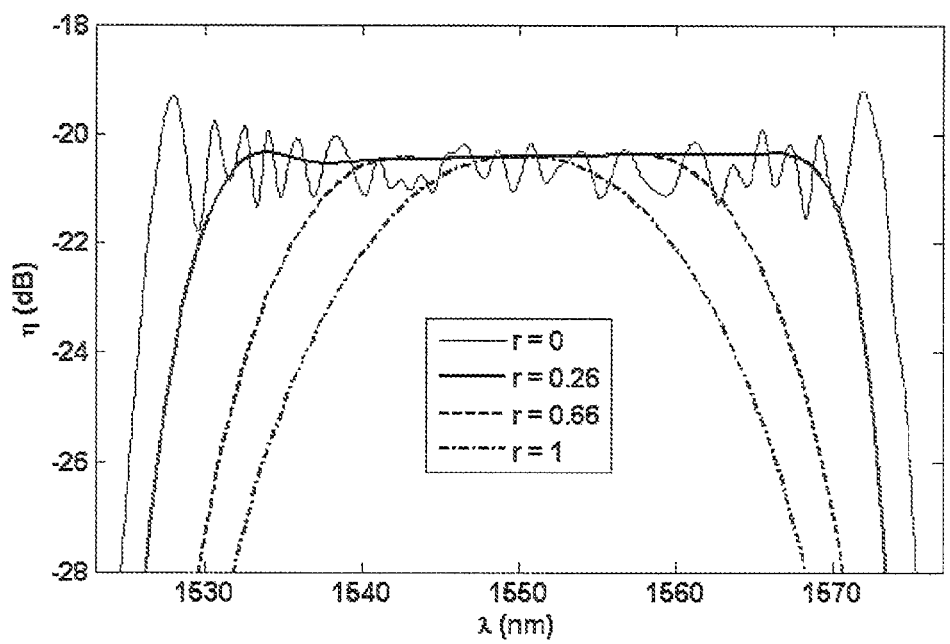
FIG. 11 is a graph of second harmonic generation efficiency of a step-chirped grating and an apodized step-chirped grating for the different apodization parameters with n=5, $p_t=600$, $\Lambda'_i=16881$ nm and $\Delta\Lambda=1$ nm, in accordance with an embodiment.

FIG. 11 illustrates the efficiency of the unapodized r=0 and apodized gratings structure for $p_t=600$, n=5, $\Lambda'_1=16881$ nm and $\Delta\Lambda=1$ nm. For r=0.26, a flat bandwidth of about 44 nm and the maximum flat efficiency of about −20.5 dB can be obtained.

Figure 12:
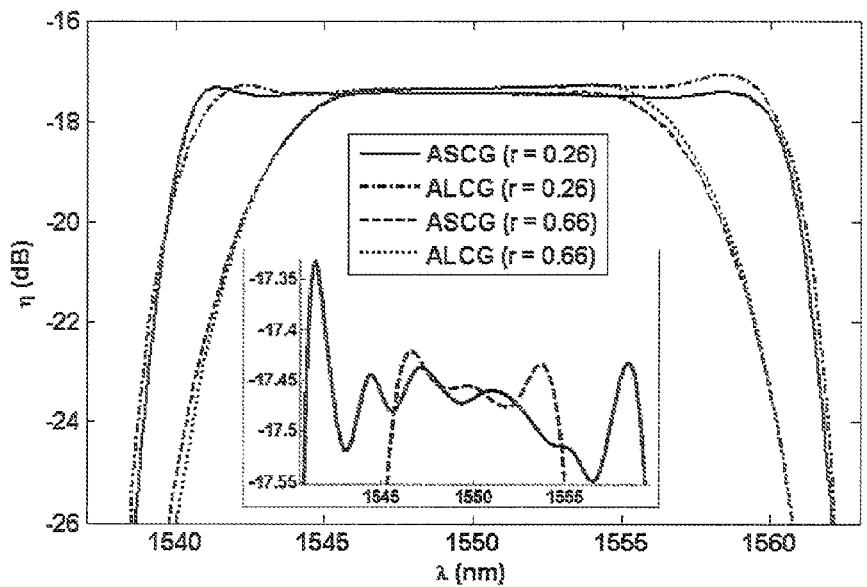
FIG. 12 is a graph of second harmonic generation efficiency for an apodized linearly chirped grating and an apodized step-chirped grating having a same length, with a high resolution detail in an inset, in accordance with an embodiment.

FIG. 12 gives a comparison between SCGs (n=10) and LCGs (n=1) when the steps in the periods are 1 nm and 0.1 nm, respectively. Following the approach described above, if the chirp changes to one-tenth and the sections increase ten-fold (which changes the SCG into a LCG structure), the results are approximately the same. Thus to achieve the same result, the apodized LCG needs smaller chirp step in comparison to the apodized SCG.

Therefore, to obtain substantially the same bandwidth and efficiency of an ALCG, an ASCG increases the chirp step, at the price of more segments. On the other hand, for the same length, the ASCG scheme reduces the number of sections and therefore increases the changes in the width of the poled region or the duty factor. Thus, increasing the chirp step and duty-factor change makes the ASCG more convenient for fabrication. The curves in the inset of FIG. 12 show details of how the ripples and spectral ears of the ASCG structure can be suppressed with increasing apodization ratios. Also, the slight slope between the ears in ALCG is basically a result of nonlinear wave number variation $2\pi/\Lambda(x)$, although the QPM period $\Lambda(x)$ is linear.

In one embodiment, the wavelength converter comprises few-segment ASCGs in a MgO-doped LN substrate. MgO-doped LN waveguides have a higher optical damage threshold with respect to LN waveguides, and can also operate at room temperature. Therefore, the inverted domains in the form of few-segment ASCG in MgO-doped LN waveguides are designed so that the bandwidth is broadened to >50 nm with a smaller number of segments and larger step chirp.

Figure 13:
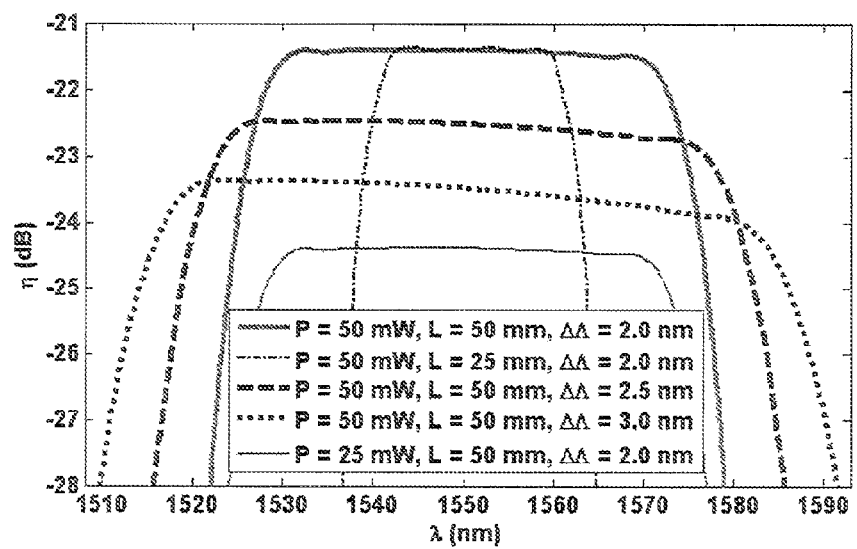
FIG. 13 is a graph of second harmonic generation efficiency versus a fundamental harmonic wavelength for 6-segment apodized step-chirped gratings with r=0.40 and different parameters, in accordance with an embodiment.

Using the MgO-doped PPLN information provided by the fabricator including the extraordinary refractive index as $$n_e^2 = 4.5583 + \frac{0.091806}{\lambda^2 - 0.048086} - 0.032068\lambda^2, \qquad \text{Eq. 18}$$

leads to a period of 18.85 μm around 1550 nm. Based on the procedure illustrated above, the number of sections required for a unit bandwidth (in nm) for a 5-cm ASCG in MgO-doped LN is calculated to be roughly 8.5 sections for a chirp step of 2 nm, and thus $p_t \approx 17\Delta\lambda/\Delta\Lambda$. Therefore, for a 50-nm-bandwidth ASCG with the length of 5 cm and a chirp step of 2 nm, it is necessary to have the number of segments equal or less than 6 using $n=L_t/p_t\Lambda_{p/2}$. Thus, for maximum conversion efficiency, a 6-segment ASCG is designed to provide the 50-nm flattop bandwidth with apodization ratio of r=0.40. Also, the minimum line width ($\alpha_i\Lambda_i$) is considered to be 100 nm. FIG. 13 illustrates the SHG efficiency of the 6-segment ASCG versus FH wavelength, assuming different large chirp steps, waveguide length and input power parameters. FIG. 13 demonstrates that keeping the chirp step around 2 nm leads to a nearly flat response and the enhancement of the chirp step leads to a slanted response with increasing bandwidth, and a decrease in efficiency. Nevertheless, slight slopes are seen in the response for $\Delta\Lambda=2.5$ nm and 3 nm. Moreover, the noteworthy feature of the ASCG is that when the input power is halved (25 mW), the efficiency is also halved and the bandwidth is nearly unchanged. On the other hand, decreasing the waveguide length to one half (25 mm), decreases the bandwidth to almost one half while the efficiency remains the same. The reasons for this are based on the ASCG structure which consists of several unchirped sections with nearly equal lengths (due to chirped structure the periods change between sections and therefore they are different in length, e.g., about 12-nm length difference between two adjacent sections for 6-segment ASCG), each of which produces almost the same efficiency for the phase-matched wavelength of that section (and this is proportional to the squared length of the section) and a similar bandwidth with a small shifted central wavelength. Thus, as we increase the sections with a small chirp step between them, we consequently increase the length and the equivalent bandwidth of the whole SCG while the mean efficiency remains almost unchanged. At the same time as the length of each section is very small, its efficiency changes linearly with power, as in unchirped phase matching. Therefore, the results show that the bandwidth and efficiency are almost linearly proportional to the length and input power, respectively. Further, there is another notable point which is useful for controlling the flat-top bandwidth of the phase matching response of the ASCG. FIG. 13 shows for a constant length, raising the chirp step, increases the bandwidth (and the slant in the response) and decreases the efficiency.

While ASCGs having a minimum line width $(\alpha_i \Lambda_i)$ of 100 nm are efficient in providing a substantially flat and broad bandwidth, fabricating such ASCGs may be an issue.

For fabrication of quasi-phase matched gratings, techniques using liquid electrodes and high-voltage pulse application are usually employed.

In one embodiment, a comb-shaped photo-resist pattern such as a 6-μm $SiO_2$ layer for example whose structure is the same as the poling period is formed on the surface of an LN substrate with a thickness of (T≈0.5 mm) for example, using a conventional photo or electron-beam lithographic technique. A liquid electrode consisting of saturated solution of lithium chloride is applied to both sides of the LN surface while insulation between them is preserved. The solution is confined within plastic frames sandwiching the crystal. A high-voltage pulse (~coercive field 21 kV/mm×T=10.5 kV) is then applied to the LN substrate. This reverses the spontaneous polarization under the electrode.

For fabrication of waveguides, titanium in-diffusion and annealed proton exchange (APE) in LN are usually used. Ti-diffused LN waveguides has been used in many integrated optic devices.

In one embodiment, the diffusion source is a Ti film with thickness of 50-100 nm for example, deposited on the crystal surface. The source is thermally diffused into the crystal at ~1000° C. for several hours. These waveguides with an index difference of ~0.01 support both the TE and TM modes with very low propagation loss (as low as 0.1 dB/cm) at a wavelength of ~1.5 μm. However, APE waveguides may be preferred because of their resistance to photorefractive damages and the possibility of smaller mode fields due to tight confinement but their losses are a little higher at 0.35 dB/cm at a wavelength of ~1.5 μm. For APE waveguide fabrication, a mask pattern of $SiO_2$ is first formed photo-lithographically on the LN substrate. Proton-exchanged lithium niobate optical waveguides are made by immersing the LN substrate at an elevated temperature (160-240° C.) into a proton donor solution such as benzoic acid for several tens of minutes. Parts of the $Li^+$ ions in the substrate are exchanged for protons to obtain a thin (several microns thick) waveguide layer on the substrate. The proton-exchanged waveguides are thermally annealed (~350° C.) to diffuse protons from the initial layer to a deeper region of the substrate to anchor the protons and stabilize the characteristics, reduce the relatively high propagation losses, and avoid a reduction in effective nonlinearity. The resulting waveguide's extraordinary refractive index is higher than that of the substrate with a difference of ~0.09, while the waveguide's ordinary refractive index is lower than that of the substrate. Thus, the APE waveguides in z-cut LN (when the cut of the crystal is perpendicular to c-axis) support only TM modes.

Usual techniques for fabricating QPM gratings present limitations with respect to the minimal dimension for the doped regions that can be made. The minimal width for a doped region that can be fabricated using a usual fabrication technique is substantially 1 micron.

While an ASCG having a minimal poled region width of 100 nm, which substantially corresponds to about 0.5% of the grating period, is efficient in providing both a substantially flat and broad bandwidth as described above, a person skilled in the art would expect the advantage of apodization, i.e. the flattening of the bandwidth, to dramatically decrease with the increase in the minimal poled region width. For example, the skilled person would expect that increasing the 100 nm minimal doped region width by a factor of ten would provide an ASCG substantially inefficient in reducing the bandwidth ripples. For example, the skilled person would expect an ASCG having a minimal line width of 1 micron to provide a bandwidth having ripples of more than 0.3 dB.

Furthermore, apodization is a technique that has been first developed for fiber Bragg gratings (FBGs). It is well known to a person skilled in the art that to arrive at a flat top FBG using apodization requires near perfect control of the grating parameters. A precision better than a few nanometers for a period of 1 micron over the entire length of the FBG is required to obtain a substantially flat bandwidth. This requirement corresponds to less than one percent of the FBG period. Truncating the apodization profile of an FBG results in ripples in the reflection spectrum of the FBG as well as asymmetry. These ripples caused by the truncation of the apodization profile leads the person skilled in the art that a near perfect structure is required to achieve a flat bandwidth, i.e. a precision of less than 1% of the period. Therefore, when apodization is applied to periodically poled structure, the person skilled in that would not expect an ASCG having a first linewidth of more than one 1% to be efficient in providing a substantially flat bandwidth.

The inventors have unexpectedly discovered that increasing the minimum poled region width in the ASCG to 1 micron, which corresponds to more than 1% of the period, allows to attain substantially the same efficiency responses with respect to a minimum poled region width of 100 nm, with a small price of a slight increase in the non-uniformity of conversion efficiency over the bandwidth in the benefit of facilitating the poling and fabrication processes. This unexpected result may be explained by the fact that more than one wavelength is involved in the nonlinear interactions and/or that dispersion in the poled material helps the device to remain more tolerant than the FBG.

Figure 14:
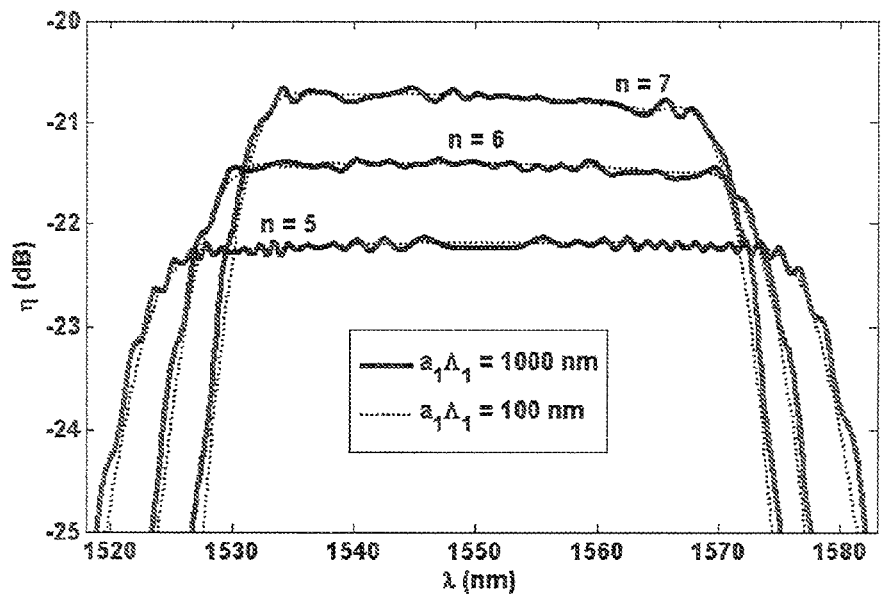
FIG. 14 is a graph of second harmonic generation efficiency versus a fundamental harmonic wavelength with r=0.40 for 5-, 6- and 7-segment apodized step-chirped gratings when $L_t \approx 50$ mm, in accordance with an embodiment.

FIG. 14 illustrates the efficiency curves versus input wavelength for the 5-, 6- and 7-segment ASCG for an apodization ratio of 0.4, a length of ~5 cm and an input FH power of 50 mW. It shows that using $\alpha_t \Lambda_i = 1$ µm unexpectedly introduces a small fluctuation in the response of only ±0.15 dB. Furthermore, increasing the minimum line width also makes the fabrication of the few-segment apodized step-chirped gratings with the large chirp steps more convenient.

FIG. 14 also demonstrates that decreasing the number of segments for the same length, increases the bandwidth and decreases the efficiency. Thus, it is possible to achieve higher bandwidth when there are fewer segments in more sections in the same length and it is a good technique to design highly-broadband frequency converters. Consequently, a bandwidth >65 nm can be obtained for a 5-segment ASCG while the efficiency can be linearly increased with the enhancement of input FH power.

Table 1 shows the design parameter for the apodized SCG (6-segment) and apodized LCG (1-segment) structure with a ~5-cm MgO-doped LN waveguide and the central period of 18.85 µm around the central FH wavelength of 1550 nm (from uniform grating) with the bandwidth of around 50 nm and the mean efficiency of −22 dB (for 17 dBm input FH power) when the minimum width of line is 100 nm (fine) or 1000 nm (coarse).

TABLE 1

Design parameters for different engineered chirped gratings to achieve almost the same mean efficiency and bandwidth.

|  | ASCG (Coarse) | ASCG (Fine) | ALCG (Coarse) | ALCG (Fine) |
|---|---|---|---|---|
| Min. line width ($a_1 \Lambda_1$) | 1000 nm | 100 nm | 1000 nm | 100 nm |
| Ripple (dB) | ±0.15 dB | ±0.05 dB | ±0.15 dB | ±0.05 dB |
| Chirp step ($\Delta\Lambda$) | 2 nm | | 0.3 nm | |
| Sections ($p_t$) | 450 | | 2700 | |
| Segments (n) | 6 | | 1 | |

Figure 15:
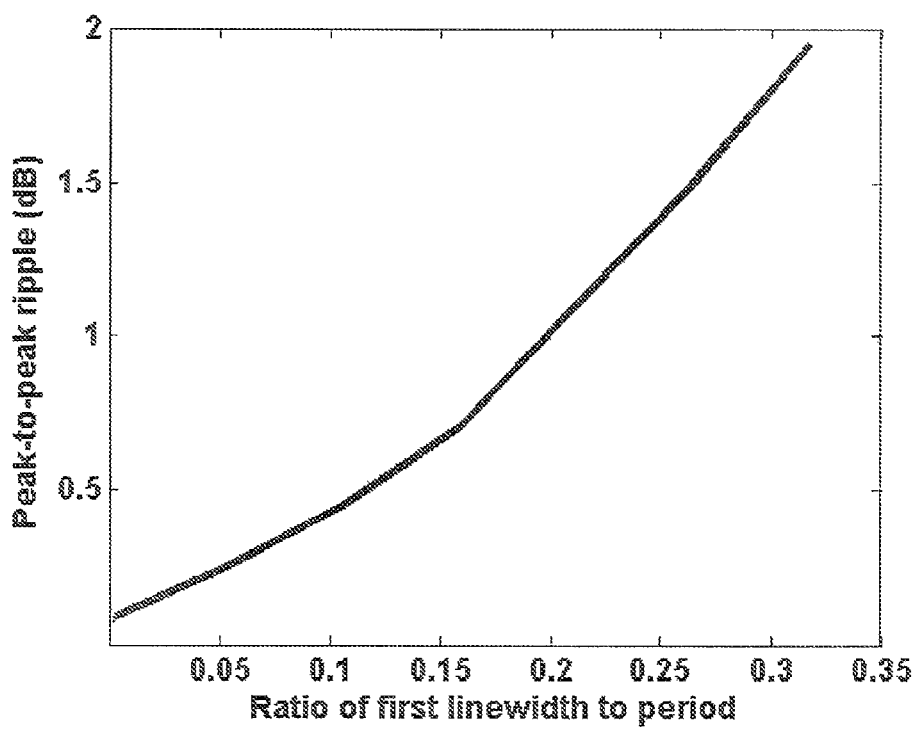
FIG. 15 is an exemplary graph of peak-to-peak ripple on SHG efficiency response curves for different ratios of first linewidth to period in 10-segment apodized step-chirped gratings having a same length of about 5 cm with r=0.40, in accordance with an embodiment.

FIG. 15 illustrates the variation of the peak-to-peak ripple (in dB) on the efficiency response curves of apodized devices versus the ratio of the minimal poled region width normalized to the period (18.9 micron) for a 10-segment, 270-section apodized step-chirped grating with a 2-nm chirp step having a same length of ~50 mm. While the peak-to-peak ripple for an unapodized grating is about 2.6 dB, FIG. 15 shows that a normalized minimal poled region width of about 5.3%, which substantially corresponds to a 1 micron minimal poled region width, allows to obtain a peak-to-peak ripple of less than 0.3 dB, thereby showing the efficiency of a 1 micron minimal poled region width in reducing the ripples.

As described above, the SHG efficiency of the ASCG is diminished compared to the uniform grating with the same length. In one embodiment, the efficiency can be boosted with small-cross-section waveguides. This is because the coupling factor is inversely dependent on the square root of the waveguide effective cross section. Therefore, a smaller cross section may lead to higher efficiency. To achieve this goal, APE waveguides can be chosen because of the possibility of higher index difference and a smaller mode field cross section but reported loss of APE waveguides in LN is greater than that of Ti-indiffused waveguides in LN (e.g., >0.1 dB/cm). However, Ti-indiffused waveguides are limited in terms of signal input power.

Figure 16:
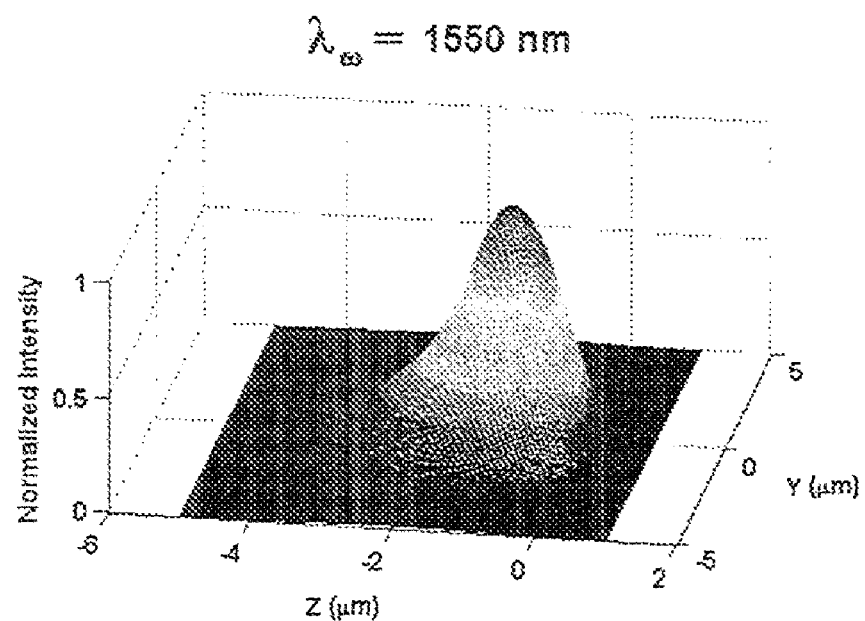
FIG. 16 illustrates an optical field distribution for a fundamental harmonic at $\lambda_\omega=1550$ nm in an annealed proton exchange waveguide, in accordance with an embodiment.
Figure 17:
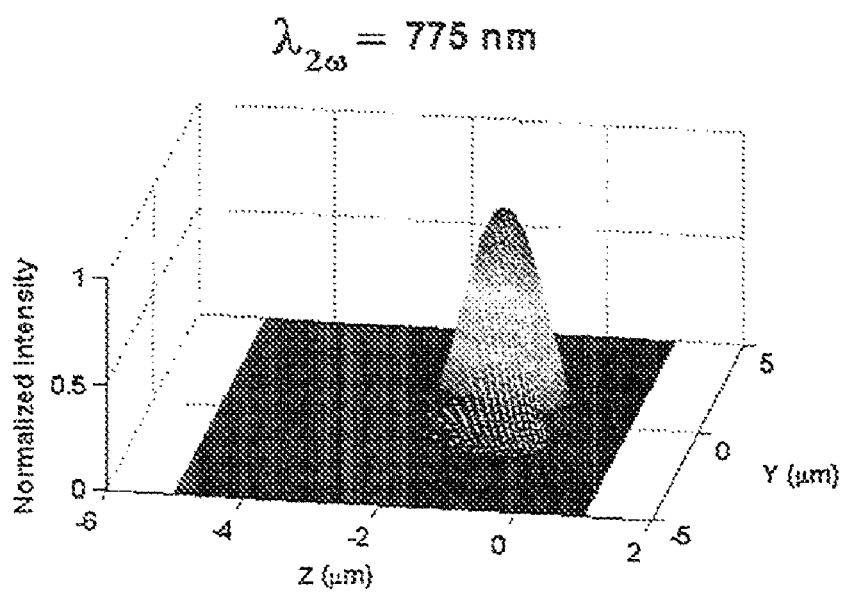
FIG. 17 illustrates an optical field distribution for a second harmonic at $\lambda_{2\omega}=775$ nm in the annealed proton exchange waveguide of FIG. 16, in accordance with an embodiment.

In one embodiment, the design of substantially broadband SHG using APE waveguide is as follows. Using APE waveguides such as the waveguide illustrated in FIG. 1, it is possible to enhance the efficiency due to the smaller effective cross section. In one embodiment, an optical waveguide is designed in which we consider the dimensions of ~3 µm×1.25 µm to achieve the maximum confinement resulting to a tighter coupling coefficient between FH and SH. However, we consider the dimensions of the lithium niobate waveguide in such a way as to support one guided mode for both FH and SH waves. The result for optical field distribution in the resultant single mode waveguide is depicted in FIGS. 16 and 17 in which 3.1 µm×2.1 µm and 2.3 µm×1.25 µm, respectively, are the mode widths of FH and SH, respectively. These result in a small effective-cross-section of ~5 µm² which later leads to a higher coupling factor between the FH and SH waves and thus a higher SHG efficiency.

Figure 18:
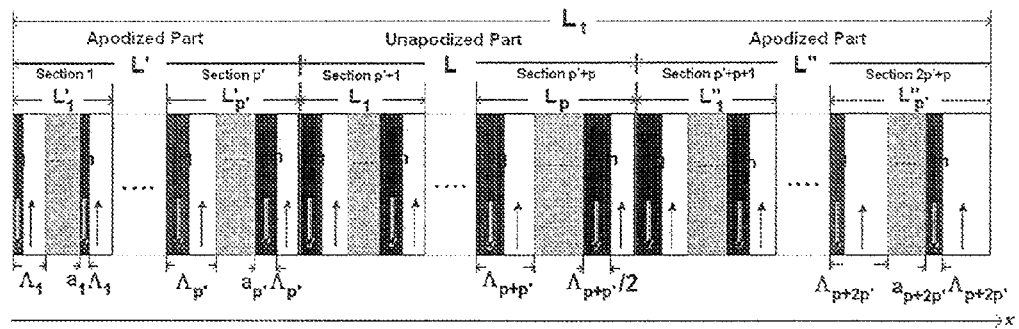
FIG. 18 is a schematic of apodized step-chirped grating structures (n>1) with increasing and decreasing parts of inverted domains, in accordance with an embodiment.

FIG. 18 illustrates the form of the ASCG on top of the APE waveguide in LN. Based on the procedure described above, the number of sections required for a unit bandwidth (in nm) from a 5-cm ASCG in LN is calculated to be roughly 10 sections for a chirp step of 0.75 nm and thus $p_t \approx 7.5 \Delta\lambda/\Delta\Lambda$. Therefore, for a 30-nm-bandwidth ASCG with a length of 5 cm and a chirp step of 0.75 nm, using $n = L_t/p_t \Lambda_{p/2}$, it is necessary to have a number of segments ≦10. Therefore, to achieve higher efficiency, we choose larger number of segments, namely 10.

In one embodiment, the central period for the central wavelength (for a PPLN at 1550 nm) is obtained to be around 14.43 µm. This rules that a ~5-cm grating can accept around 3500 periods. Thus, this results in having 350 sections, each of which has 10 segments. The period of the grating starts at $\Lambda_1 = 14303$ nm and finishes at $\Lambda_{350} = 14565$ nm. The apodization ratio is kept around 0.4 to achieve the maximum bandwidth with flat response, which leads to using 140 apodized sections (i.e., r=140/350) equally set in the beginning and the end of the structure. The parameters of the designed ASCG in detail are given in Table 2.

TABLE 2

Design parameters of the ASCG for broadband SHG (r ~0.4).

| Parameter | value | Description |
|---|---|---|
| n | 10 | No. of periods in each section |
| $p_t$ | 350 | Total no. of sections |
| 2p' | 140 | Total no. of apodized sections |
| $\Lambda_1'$ | ~14.3 µm | Period of first section |
| $\Delta\Lambda$ | 0.75 nm | Step chirp |
| $N_\omega$ | ~2.15 | Effective index for FH |
| $N_{2\omega}$ | ~2.20 | Effective index for SH |
| $\lambda_c$ | 1550 nm | FH central wavelength |
| $L_t$ | ~5 cm | Total length of gratings |
| $d_{33}$ | 25 pV/m | NLO coefficient of LN |
| $\Delta n_e$ | 0.09 | Max. index difference |
| $a_1$ | 100 nm | Width of first poled region |
| W | 3 µm | Waveguide width |
| D | 1.25 µm | Waveguide depth |
| κ | ~262 $W^{-1/2}m^{-1}$ | Coupling factor |

Figure 19:
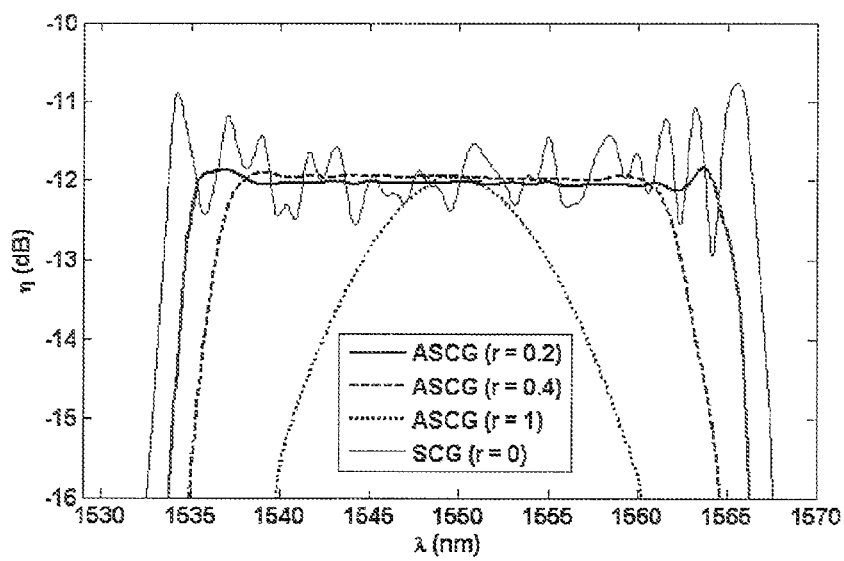
FIG. 19 illustrates a second harmonic generation efficiency comparison of step-chirped grating and apodized step-chirped gratings for the different apodization ratios where n=10 and $\Delta\Lambda=0.75$ nm, in accordance with an embodiment.

FIG. 19 illustrates the SHG efficiency of the SCG and ASCGs (n=10) versus the FH wavelength and provides a comparison between them for different r parameters when the chirp step is 0.75 nm. Similar curves to FIG. 10 with higher SH efficiency is achieved showing how the ripples of the ASCG may also be suppressed with increasing r. For a small apodization ratio r=0.2, the efficiency is nearly ripple-free with the bandwidth of ~32 nm, except for the two residual ears at the edges, and the maximum flat efficiency of about −12 dB can be achieved. Further suppression of these spectral ears can be achieved by introducing longer apodization regions. For r=0.4, the nearly flat bandwidth of ~30 nm with the maximum flat efficiency of about −12 dB can be achieved showing almost 5.5 dB increase compared to that of FIG. 10 with the same length and input FH power. It is seen that with increasing r up to 1, it is possible to obtain improved and different forms of efficiency curves with correspondingly smaller bandwidths.

Figure 20:
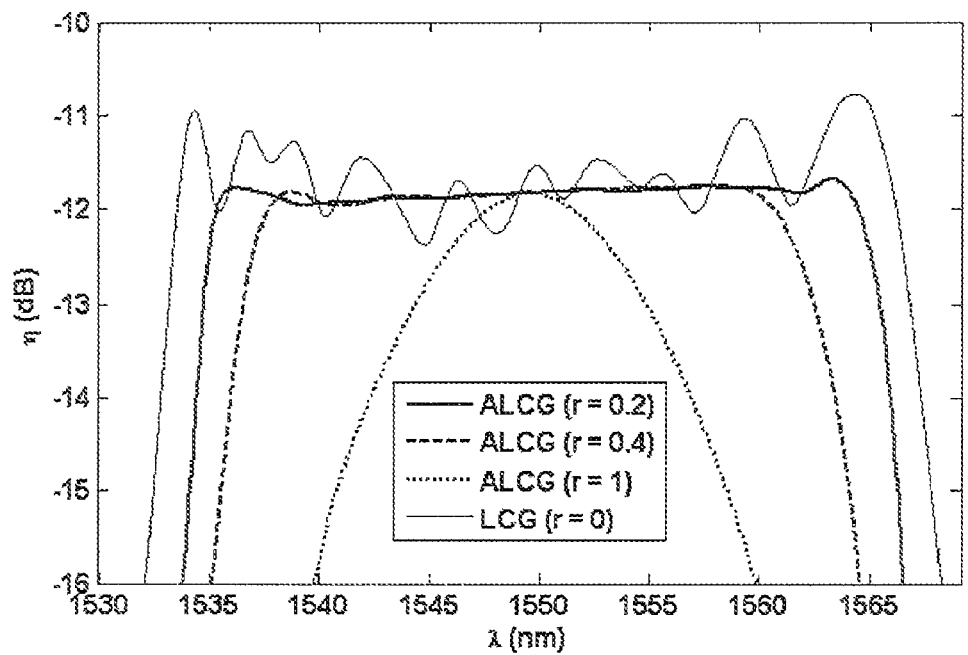
FIG. 20 illustrates a second harmonic generation efficiency comparison of a linearly-chirped grating and an apodized linearly-chirped grating for different apodization ratios where n=1 and ΔΛ=0.075 nm, in accordance with an embodiment.

FIG. 20 illustrates the SHG efficiency of the LCG and ALCGs (n=1) versus the FH wavelength when the chirp step is 0.075 nm. It provides a comparison between LCG and ALCGs for different r parameters so that different forms of efficiency curves with different bandwidths can be achieved. Based on the approach, the enhancement of conversion efficiency and reduction of ripples in the SHG efficiency response of ALCGs by increasing and decreasing of the duty ratio of inverted domains at the beginning and end parts of LCG are demonstrated. It shows how the ripples and spectral ears of the ALCGs can be suppressed with increasing apodization ratios. Again, the slight slope seen between the ears in the ALCG is basically a result of nonlinear wavenumber variation, although the QPM period changes linearly.

A comparison between FIGS. 19 and 20 shows that if the chirp period changes to one-tenth and the sections increase tenfold (which changes the SCG into the LCG structure), the results are substantially the same. Thus to achieve the substantially same result, the apodized LCG needs smaller chirp period in comparison to the apodized SCG. Therefore, to obtain substantially the same bandwidth and efficiency of ALCG, ASCG increases the chirp step, at a cost of more segments. On the other hand, for the same length, the ASCG reduces the number of sections and therefore increases the changes in the width of the poled region or the duty cycle. Thus, increasing the chirp step and duty-cycle change makes the ASCG more convenient for fabrication.

Figure 21:
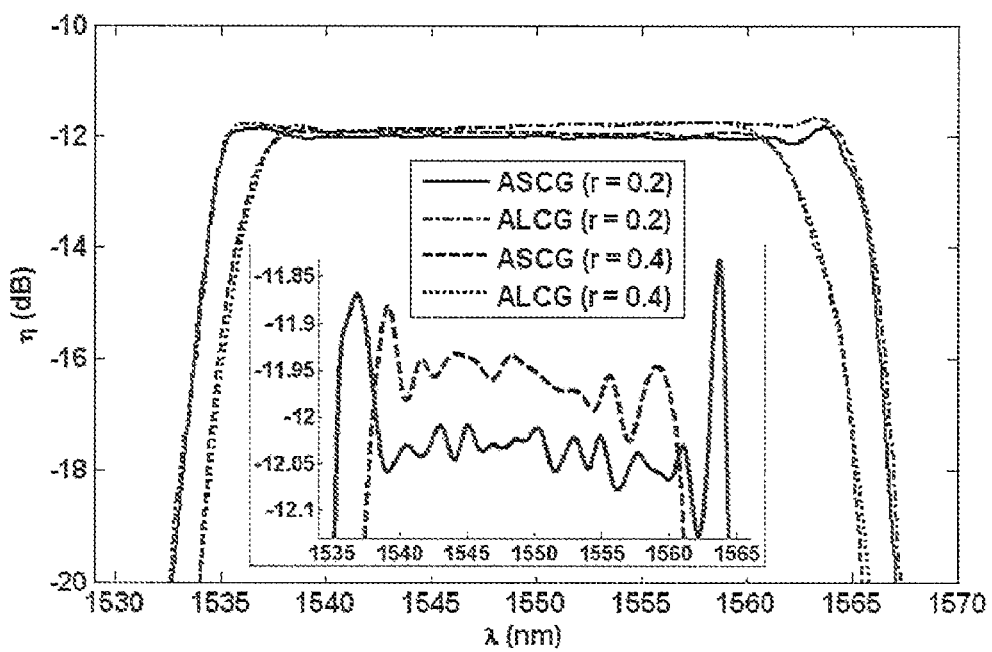
FIG. 21 is an exemplary graph of second harmonic generation efficiency of a linearly-chirped grating and a step-chirped grating, and an apodized linearly-chirped grating and an apodized step-chirped grating, for a same length, with a high resolution detail in an inset, in accordance with an embodiment.

FIG. 21 illustrates the efficiency of the ASCG (n=10) and ALCG (n=1) structures versus the FH wavelength and gives a comparison between them for different r parameters when the steps in the periods are 0.75 nm and 0.075 nm, respectively. For r=0.2, the nearly flat bandwidth of about 32 nm with the ears at the edges and the maximum flat efficiency of about −12 dB can be achieved for both cases while ASCG suppress the slope of the efficiency in comparison to ALCG. The SHG efficiency of the small-cross-section waveguide improves around 5.5 dB due to the enhancement of the coupling coefficient in comparison to the large-cross-section waveguide in FIG. 12. Also, the SHG bandwidth for the small-cross-section waveguide has a maximum of 10-nm increase due to the increment of $p_t$ and decrement of $\Delta\Lambda$. The curves in the inset of FIG. 21 show how the ripples of the ASCG may also be suppressed with increasing r. Also, further suppression of spectral ears can be achieved by introducing larger apodization ratio shown for r=0.4.

In one embodiment, the SHG efficiency of ASCG for quasi continuous waves (CW) may be increased with resonant structures. A Fabry-Pérot type cavity maybe constructed in a waveguide SHG device by placing cavity mirrors on waveguide facets.

Figure 22:
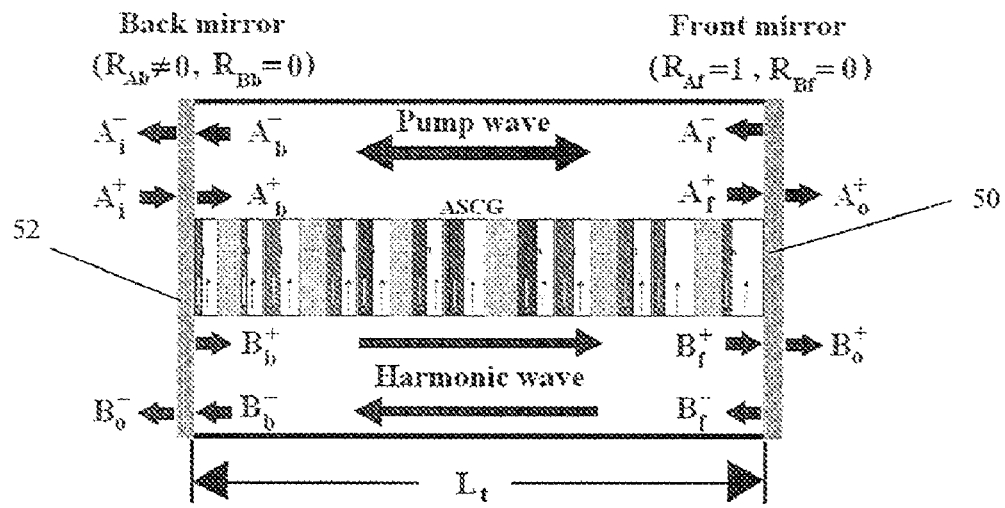
FIG. 22 is a schematic of a singly pump-resonant waveguide for a broadband apodized step-chirped grating frequency doubler, in accordance with an embodiment.

In one embodiment, a substantially broadband SHG using pump-resonant waveguide can be designed as follows. A Fabry-Pérot type cavity enables the construction of a singly pump-resonant device including the designed ASCG achieved by imposing cavity mirrors on waveguide facets, to resonate the quasi-CW pump for SHG. A singly pump-resonant device for the proposed broadband frequency doubler is shown in FIG. 22.

Cavity mirrors 50 and 52 are set to the front and back facets of the waveguide ASCG frequency doubler, respectively. A quasi-CW FH pump wave launched from the back side, propagates and resonates in the waveguide cavity. The SHG can occur in the waveguide, with an SH quasi-CW as the output. The power reflection coefficients for the FH and SH are described by $R_{Ab}$ and $R_{Bb}$ for the back-facet mirror and by $R_{Af}$ and $R_{Bf}$ for the front-facet mirror, respectively. Nevertheless, precise control of the grating position relative to the mirrors and that of cavity length, for realization of efficient SHG in resonant waveguide devices, are necessary. Further, for an efficient resonant converter, the phase matching condition for SHG and resonance conditions for the FH wave ($2\beta_{FH}L_t=2$ m$\pi$) must be satisfied simultaneously. The latter means that the resonant longitudinal modes include the frequencies which satisfy the condition $\Delta v=1/\tau \approx c/2N_\omega L_t$, where $\tau$ is the round trip time. This mode spacing is around 1.4 GHz (i.e. ~11 pm at a wavelength of ~1550 nm) for the structure. After a round trip, the power of the FH guided wave will be $R_{Af}R_{Ab}\exp(-2\alpha L_t)$ times the initial value where $\alpha$ is the loss for the FH. The inverse of photon life time can be expressed as $$\frac{1}{\tau_P} = \frac{c}{N_\omega}\left(\alpha + \frac{1}{2L_i}\ln\frac{1}{R_{AB}R_{Af}}\right)$$

and the line width can be written as $\delta v \approx 1/2\pi\tau_p$ showing that it depends on the present loss in the low finesse resonator. Whilst the resonance condition is satisfied, the boundary conditions of a simple singly pump-resonant SHG device are $A_b^+ = \sqrt{1-R_{Ab}}A_i^+ + \sqrt{R_{Ab}}A_b^-$ and $A_i^- = \sqrt{1-R_{Ab}}A_b^- - \sqrt{R_{Ab}}A_i^+$ for the FH quasi-CW at the input facet of waveguide and $A_f^- = \sqrt{R_{Af}}A_f^+$ and $A_o^+ = \sqrt{1-R_{Af}}A_f^+$ for the FH quasi-CW at the output facet of the waveguide and $B_b^+=0$, $B_o^-=B_b^-$ and $B_o^+=B_f^+$, $B_f^-=0$ for the SH quasi-CW at the input and output facets of the waveguide, respectively. In one embodiment, a singly pump-resonant SHG device ($R_{Ab}R_{Af} \neq 0$ and $R_{Bb}R_{Bf}=0$) is preferred to a doubly resonant device as the SH power build-up may not be required.

In one embodiment, in order to obtain series of high-efficiency axial-mode SH waves from a resonant quasi-CW FH waves shown by an envelope response, a simple singly pump-resonant structure including the previously-designed 10-segment ASCG in an APE LN waveguide as a broadband frequency doubler is considered and numerically characterized assuming the different amounts of FH loss where the reflectivities are taken invariant over the bandwidth. However, for a practical singly pump-resonant device, the exact efficiency can be obtained by subtracting the additional losses such as the reflection of the quasi-CW SH waves at the mirrors in dB from the efficiency result.

Figure 23:
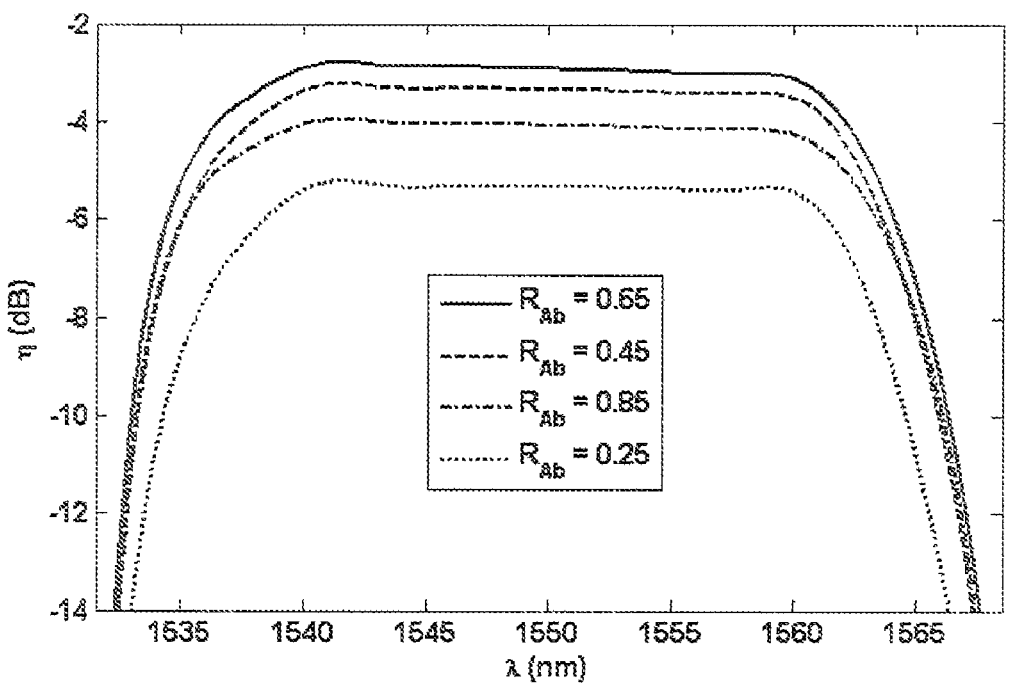
FIG. 23 is an exemplary graph of an envelope of second harmonic generation efficiency responses of a singly pump-resonant apodized step-chirped grating versus a fundamental harmonic wavelength, for $R_{Af}=1$, $\alpha L_t=1$ dB and $L_t \approx 5$ cm, in accordance with an embodiment.

FIG. 23 illustrates the envelope of SHG efficiency responses of the singly pump-resonant waveguide with the ASCG, versus FH wavelength for different $R_{Ab}$ when $R_{Af}=1$ and the total waveguide FH loss of $\alpha L_t=1$ dB. Other parameters are the same as given for FIG. 19. With increasing reflectivity of FH at the back facet mirror, the efficiency improves and reaches a maximum of ≈−2.9 dB for $R_{Ab} \approx 0.65$ and decreases again with the increasing $R_{Ab}$. Furthermore, using the resonant waveguide for the ASCG structure with r=0.4, nearly the same 3-dB bandwidth of ~30 nm (i.e. ~3.75 THz) is obtained, which includes around 2700 axial modes with an 11.2 μm (~1.4 GHz) separation and a 1.6 pm (~0.2

GHz) FWHM line width, and in the best case, at least a 9-dB improvement in peak efficiency can be achieved in comparison to FIG. 19.

Figure 24:
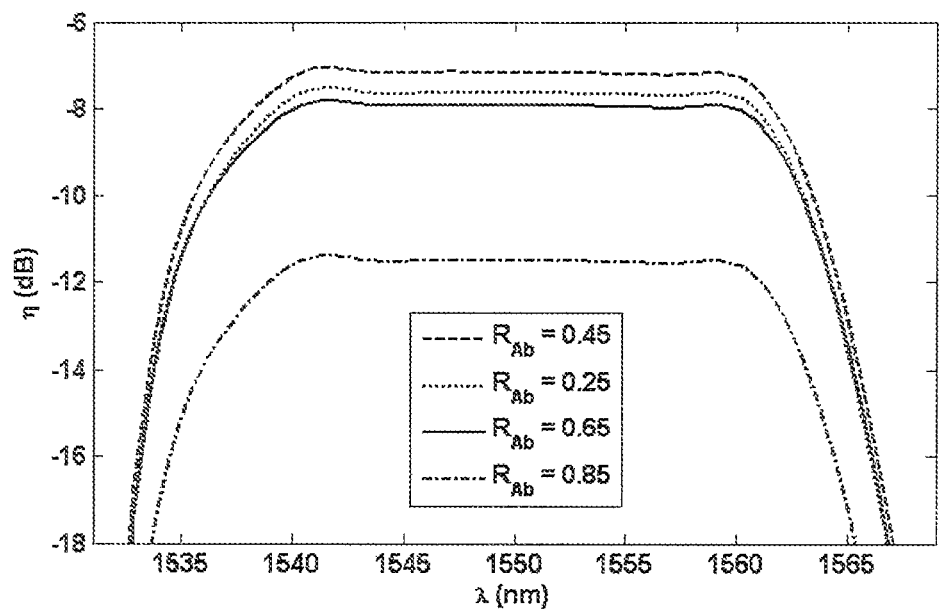
FIG. 24 is a graph of an envelope of second harmonic generation efficiency responses of a singly pump-resonant apodized step-chirped grating versus a fundamental harmonic wavelength, for $R_{Af}=1$, $\alpha L_t=3$ dB and $L_t \approx 5$ cm, in accordance with an embodiment.

FIG. 24 illustrates the envelope of SHG efficiency responses of the singly pump-resonant waveguide with ASCG, versus wavelength for different $R_{Ab}$ assuming $R_{Af}=1$ and the total waveguide FH loss of $\alpha L_t=3$ dB when other parameters of FIG. 19 remain the same. In FIG. 24, the maximum efficiency of about −7.2 dB is achieved for a lower back facet reflectivity of $R_{Ab}=0.45$ implying that more FH waveguide loss results in lower efficiency. Thus, in the case of a high-loss resonant waveguide, ~4.8-dB improvement in peak efficiency can be obtained in comparison to −12 dB for the non-resonant waveguide shown in FIG. 19. Also, FIG. 24 may be used to predict the peak efficiency when the back facet reflectivity and FH loss are $R_{Af}=0.8$ and $\alpha L_t=1$ dB, respectively. In comparison to FIG. 23 ($R_{Af}=1$ and $\alpha L_t=1$ dB), it shows that the reduction of the reflectivity of the front facet also deteriorates the efficiency even when the waveguide loss is constant.

Figure 25:
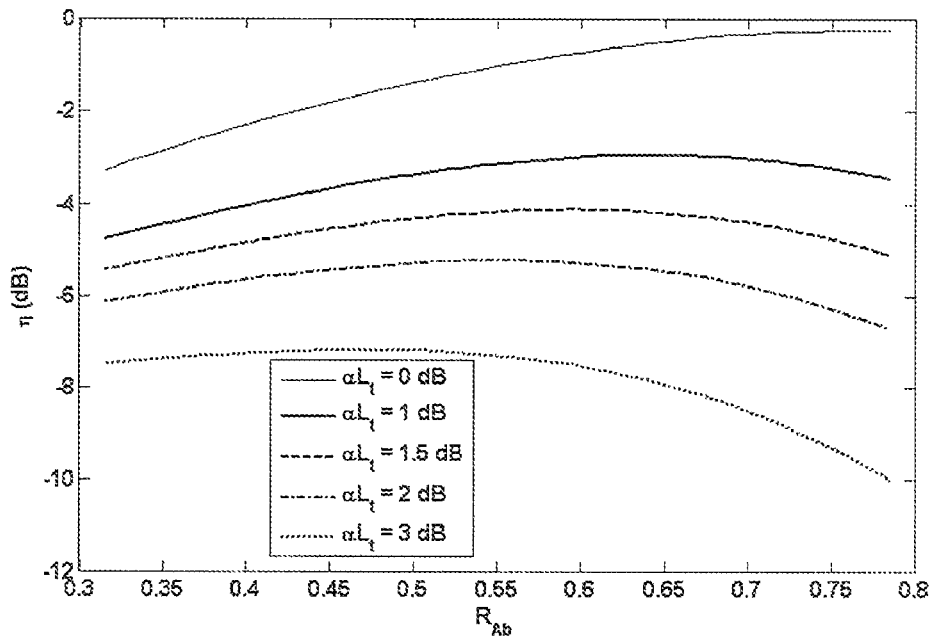
FIG. 25 is a graph of peak second harmonic generation efficiency of a singly pump-resonant waveguide with an apodized step-chirped grating, versus a back-facet reflectivity. $R_{Ab}$ for different waveguide fundamental harmonic losses when $R_{Af}=1$ and $L_t \approx 5$ cm, in accordance with an embodiment.

FIG. 25 illustrates the maximum SHG efficiency versus $R_{Ab}$ for different amounts of FH waveguide loss. It is clear that the highest efficiency is obtainable only for the lowest loss (i.e. lossless waveguide $\alpha L_t=0$). Although the efficiency degrades due to loss, remarkable enhancement is still achieved in matched situations with the proper selection of $R_{Ab}$. The matching condition for singly pump-resonant structures represents that no pump power exits from the resonator, meaning that $A_i^- = (A_b^-/A_b^+ - \sqrt{R_{Ab}})A_b^+/\sqrt{1-R_{Ab}}$ should be zero resulting in the matched situation as $A_b^-/A_b^+ = \sqrt{R_{Ab}}$. In fact, $A_b^-$ is the altered amplitude obtained during a round trip in the resonator from the transmitted pump $A_b^+$ through the back mirror. $A_b^-$ depends on the SHG pump depletion, waveguide loss and front mirror reflectivity.

In one embodiment, a singly pump-resonant structure with low propagation loss and high reflectivity of the FH at the front facet mirror is considered. Pump depletion and the efficiency are very low, mean $A_b^- \to A_b^+$ and $R_{Ab}$ moves toward unity. On the other hand, for a moderate pump depletion and efficiency (non-resonant pump case), $A_b^+ \to +A_i^+$ and $A_i^- \to A_b^-$, and $R_{Ab}$ approaches zero. Thus, for a remarkably high pump depletion and efficiency in the resonator, the matching condition $A_b^-/A_b^+ = \sqrt{R_{Ab}}$ can be satisfied and the singly pump-resonant structures provide maximum efficiency for a given loss. It can be seen that the maximum efficiencies of around −2.9, −4.1, −5.2 and −7.2 dB can be achieved for the FH losses of −1, −1.5, −2 and −3 dB when the back-facet reflectivities are 0.65, 0.6, 0.55 and 0.45, respectively. Thus, to achieve the maximum efficiency for larger FH loss, the optimum value of back-facet reflectivity can be found at lower values of $R_{Ab}$. However, there is a compromise between the FH loss $\alpha L_t$ and the reflectivity $R_{Ab}$ since for constant efficiency, the waveguide with the greater $\alpha L_t$, may need a higher $R_{Ab}$. For instance, to achieve −4.1-dB efficiency, the waveguides with 1 dB and 1.5 dB losses require ~0.4 and ~0.6 reflectivities, respectively.

Figure 26:
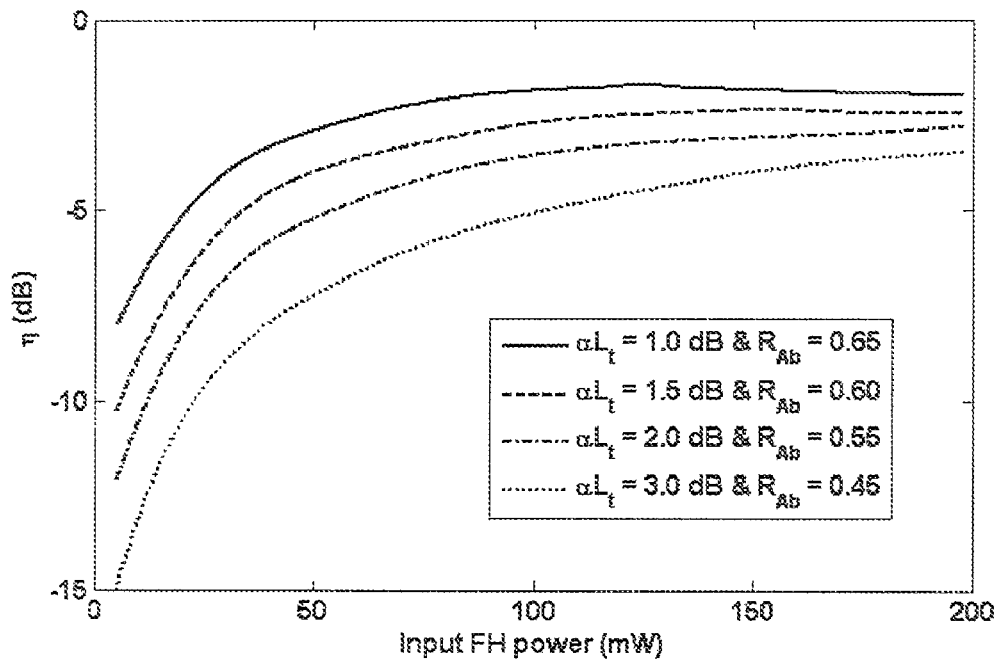
FIG. 26 is a graph of peak second harmonic generation efficiency of a singly pump-resonant waveguide with an apodized step-chirped grating, versus an input fundamental harmonic power for different waveguide losses and back-facet reflectivities when $R_{Af}=1$ and $L_t \approx 5$ cm, in accordance with an embodiment.

FIG. 26 illustrates the dependence of the maximum SHG efficiency on the input FH power for different amounts of waveguide FH loss, and the reflectivity $R_{Ab}$ for which the peak efficiency occurs in FIG. 25. It is apparent that with increasing power, the efficiency increases rapidly in the low pumping region and decreases in the high pumping region. This is because the pump power build-up in the resonator is disabled by pump depletion due to intense SHG interaction. However, the maximum efficiency of ~−1.8 dB for 125 mW input FH power is achieved when the waveguide FH loss is 1 dB and the back-facet reflectivity is 0.65. It is also evident when the waveguide loss increases, the peak efficiency is achieved at higher input FH powers but the peak value is smaller than that of the low-loss waveguides. Thus, increasing the input power for enhancement of efficiency (before the peak point) is more useful for lossy waveguides. For example, increasing the input power from 50 to 125 mW enhances the efficiency to 1.2 dB and 2.8 dB for waveguides losses of 1 dB and 3 dB, respectively.

Figure 27:
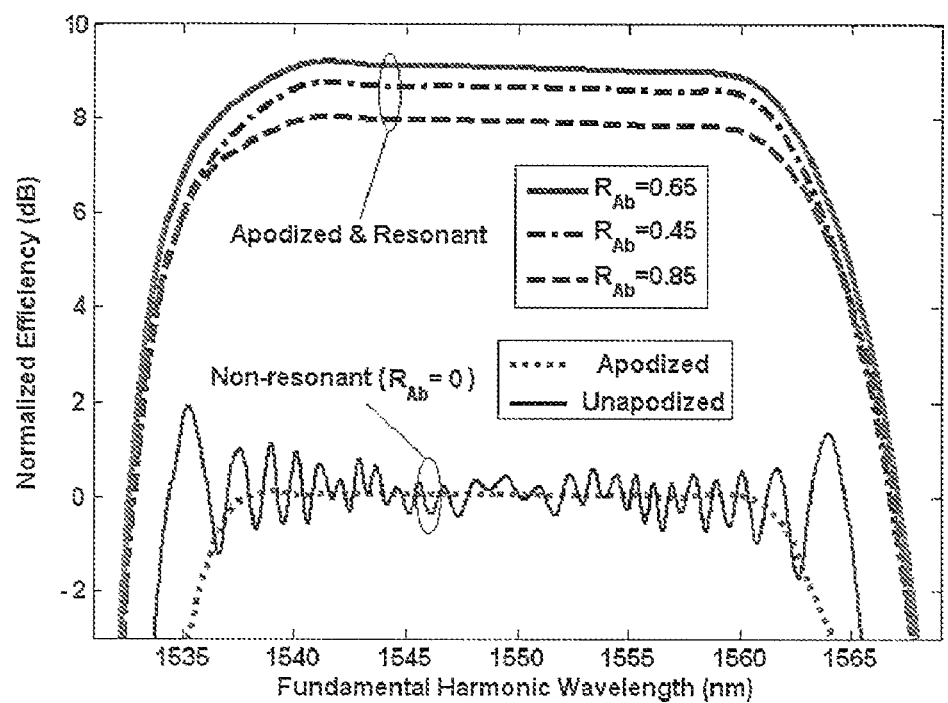
FIG. 27 is a graph of a normalized efficiency versus a fundamental harmonic wavelength, in accordance with an embodiment.

In one embodiment, a frequency converter waveguide comprise 350 sections in which each section includes 10 periods and the chirp step is about 1 nm. Next, for the apodization design, the length of the central region is composed of several sections with 1:1 duty ratios while the lengths of each of the two adjacent sides with equal sections consist of the apodized regions with symmetrically increasing and decreasing duty ratios at the input and output of the device, respectively. Here, we assume that the apodization covers ~40% of the grating's total length (L) which is about 5 cm. The efficiency, defined as the power ratio of the SH to FH intensity, for the (non-resonant) unapodized and apodized devices with the same length is shown in FIG. 27. It demonstrates that using the ASCG the ripple in the efficiency curve can be dramatically smoothed and flattened with the ripples being reduced to less than ±0.05 dB.

For the FH-resonant waveguide including ASCG, the power reflection coefficients for the FH are described by $R_{Ab}$ and $R_{Af}$ for the back-facet and front-facet mirror, respectively. Moreover, for an efficient resonant converter, the phase matching condition for SHG and resonance conditions for the FH wave must be satisfied simultaneously. The latter means that for a 5-cm-long structure, the resonant longitudinal mode separation is around 1.4 GHz (i.e. ~11 pm at a wavelength of ~1550 nm). Also, the linewidth depends on the photon life time and consequently the loss present in the low finesse resonator. Nevertheless, to obtain a series of high-efficiency conversions of the resonant axial-modes for an FH quasi-CW shown by an envelope response, an FH-resonant waveguide in LN with an ASCG is studied and numerically characterized for different amounts of FH loss. FIG. 27 also shows the normalized envelope of efficiency responses of the resonant apodized devices versus the FH wavelength for different back-facet reflectivity, $R_{Ab}$, and perfect front-facet reflectivity, $R_{Af}=1$, and a total waveguide FH loss of $\alpha L=1$ dB. With increasing $R_{Ab}$, the efficiency initially improves and reaches its maximum when $R_{Ab}=0.65$ for which the impedance matching condition is satisfied. Furthermore, the 3-dB bandwidth of ~30 nm (i.e. ~3.75 THz) is obtained, which includes around 2700 axial modes with an 11.2 pm (~1.4 GHz) separation and a 1.6 pm (~0.2 GHz) FWHM linewidth and in the best case offers at least a 9-dB improvement in peak efficiency over the non-resonant device ($R_{Ab}=0$).

As a result, an effective apodized step-chirped grating is proposed to broaden and flatten the frequency conversion bandwidth in QPM lithium niobate waveguides. Further, proposing an FH-resonant waveguide with an ASCG, we have found that the conversion efficiency envelope for quasi-continuous FH increases substantially with almost the same bandwidth, especially for low loss. For a ~21-dBm input FH power in a 5-cm-long resonant waveguide with 1-dB FH loss and the optimized back-facet reflectivity of 0.65, the maximum efficiency of about −1.8 dB over a bandwidth of 30 nm can be achieved. Additionally, larger bandwidth converters can be designed with different ASCG parameters While the present description refers to ASCG waveguides adapted to operate with a fundamental harmonic signal having a wavelength comprised between 1520 nm and 1580 nm, it should be understood that the ASGC waveguide may be adapted to operate at any adequate optical wavelength. Similarly, it should be understood that the particular values for the bandwidth the ASCG waveguides presented above are exemplary only. The ASGC waveguide may be adapted to provide a greater or lower bandwidth.

Figure 28:
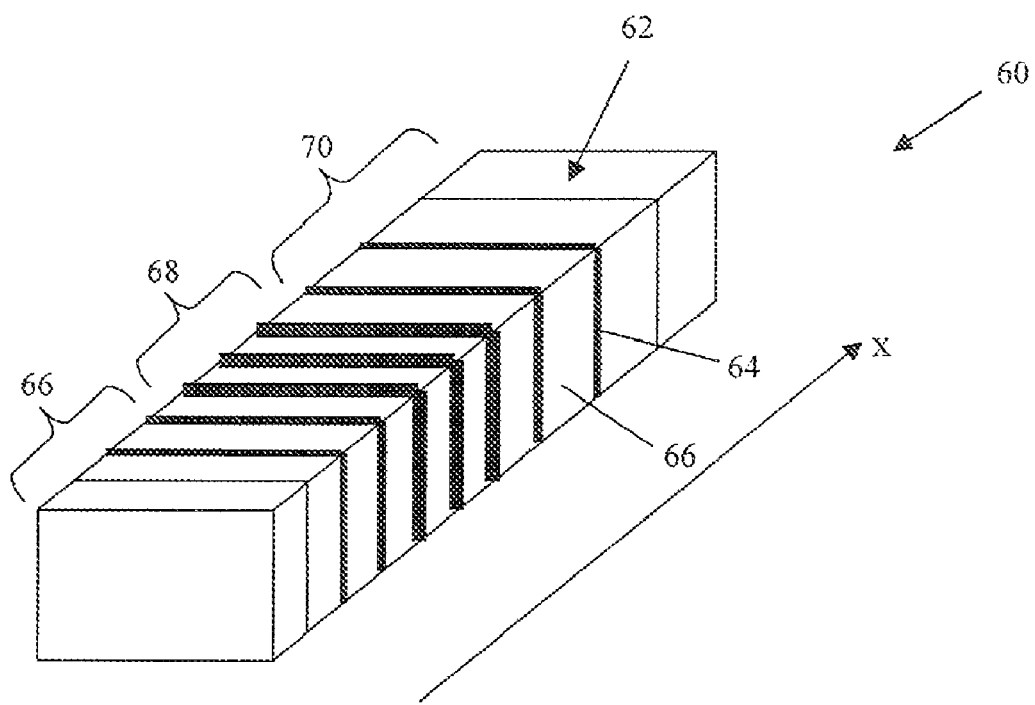
FIG. 28 is a schematic of a bulk crystal provided with an apodized step-chirped grating, in accordance with an embodiment.

While the present description refers to a frequency converter comprising an ASCG waveguide, it should be understood that the frequency converter may comprise a bulk crystal 60 provided with an ASCG 62, as illustrated in FIG. 28. The ASCG grating 62 is constituted from poled regions 64 which extend across the whole cross-section of the bulk crystal 60 and are positioned the ones adjacent to the others along the x axis of the crystal. Two following poled regions 64 are interspaced by a reversely poled region.

The ASCG grating is divided into three grating portions 66, 68, and 70. The first grating section 66 is similar to that illustrated in FIG. 2 and the duty ratio increases along the grating portion 66. The second grating section is an unapodized step-chirped grating similar to that illustrated in FIG. 3, and the duty ratio is substantially constant along the grating portion 68. The third grating portion 70 is similar to that illustrated in FIG. 4, and the duty ratio decreases along the grating portion 70.

In one embodiment, an unfocussed fundamental harmonic beam is input in the bulk crystal 60 to generate a second harmonic beam. In this case, the only difference between the guided wave equation and the bulk equation is the normalized overlap integral which is set to unity for the bulk case, compared to some smaller value for the guided wave. Also the phase-matching period for the bulk grating is determined by the bulk refractive index rather than the guided wave effective indexes of the two waves.

In one embodiment, the bulk crystal 60 is provided with reflective facets to create a Fabry-Pérot cavity similar to that illustrated in FIG. 2.

The present invention can be applied to three color generation using a single or reduced set of devices; broad-band frequency conversion (femtosecond); broad variable (waveband) wavelength conversion, ultra-short pulse compression and measurement.

The frequency converter also encompasses ultra-high power (kW) frequency conversion of short pulses in bulk crystals; fibre frequency doubling; engineered crystals with complex response: CW high power frequency without time control and/or reduced temperature control.

In one embodiment, a frequency converter 10 is used for generating green light by doubling the frequency of a near-infrared light source. The thus obtained green light source can be used in handheld projectors or micro-projectors.

The wavelength converter 10 may be used in hand-held low power consumption and efficient color projectors, temperature insensitive frequency converters, optical coherence tomography with more than one color at the same time, and the like.

It should be understood that the wavelength converters 10 and 62 may be made from at least one adequate material. For example, the wavelength converters 10 and 60 can be made from lithium niobate, magnesium oxide doped lithium niobate, titanium indiffused lithium niobate, potassium niobate (KNbO$_3$), potassium titanyle arsenate (KTiOAsO4) or KTA, adequate polymer, adequate semiconductor material, adequate ferroelectric material, or the like. In another embodiment, the wavelength converters 10 and 62 are made from two different materials, i.e. the poled regions are made from a first adequate material and the reversely poled regions are made from a second adequate material different from the first material.

It should be understood that a reversely poled region may be an unpoled region.

The embodiments of the invention described above are intended to be exemplary only. The scope of the invention is therefore intended to be limited solely by the scope of the appended claims.

The invention claimed is:

1. An optical frequency converter comprising:
    an optical guiding structure having an input for inputting a fundamental harmonic signal and an output for outputting a second harmonic signal, and comprising:
    a first grating portion adjacent to said input;
    a second grating portion adjacent to output, and
    a third grating portion between said first and second grating portions to form an apodized step-chirped grating extending between said input and said output,
    each one of said first, second, and third grating portions comprising a plurality of sections each comprising a plurality of segments, each segment having a segment width and comprising a poled region having a poled width at least equal to one micron and a reversely poled region, said segment width for said first, second, and third grating portions and a duty ratio of said poled width to said segment width being constant within each one of said sections, said segment width increasing from one of said sections to a following one of said sections from said input towards said output, said duty ratio increasing from one section to a following one within said first grating portion, decreasing from one section to a following one within said second grating portion, and being constant within said third grating portion.

2. The optical frequency converter as claimed in claim 1, wherein said optical guiding structure is a planar optical waveguide comprising a channel, said first, second, and third gratings extending along at least a portion of said channel.

3. The optical frequency converter as claimed in claim 1, wherein said optical guiding structure is a bulk crystal having a length, said first, second, and third gratings extending along at least a portion of said length.

4. The optical frequency converter as claimed in claim 1, further comprising a first mirror having a first reflectivity at said input and a second mirror having a second reflectivity at said output to form a Fabry-Pérot cavity.

5. The optical frequency converter as claimed in claim 4, wherein said first reflectivity for said fundamental harmonic signal is less than one and said second reflectivity for said fundamental harmonic signal is substantially equal to one.

6. The optical frequency converter as claimed in claim 4, wherein said first reflectivity and said second reflectivity for said second harmonic signal is substantially equal to zero.

7. The optical frequency converter as claimed in claim 1, wherein said optical guiding structure is made of lithium niobate.

8. The optical frequency converter as claimed in claim 7, wherein said lithium niobate comprises indiffused titanium.

9. The optical frequency converter as claimed in claim 7, wherein said lithium niobate is magnesium oxide doped.

10. The optical frequency converter as claimed in claim 1, wherein said optical guiding structure is made of potassium niobate.

11. The optical frequency converter as claimed in claim 1, wherein said optical guiding structure is made of potassium titanyle arsenate.

12. The optical frequency converter as claimed in claim 1, wherein said optical guiding structure is made of a polymer.

13. The optical frequency converter as claimed in claim 1, wherein said optical guiding structure is made of a semiconductor material.

14. The optical frequency converter as claimed in claim 1, wherein said duty ratio is substantially equal to 0.5 within said third grating portion.

15. The optical frequency converter as claimed in claim 1, wherein said poled region is made from a first material and said reversely poled region is made from a second material different from said first material.

* * * * *